United States Patent
Jung et al.

(10) Patent No.: US 10,003,386 B2
(45) Date of Patent: Jun. 19, 2018

(54) METHOD AND APPARATUS FOR PROVIDING OPTIMAL TRANSMISSION AND RECEPTION BEAMS IN BEAMFORMING SYSTEM

(71) Applicant: Samsung Electronics Co., Ltd., Gyeonggi-do (KR)

(72) Inventors: Jung-Soo Jung, Gyeonggi-do (KR); Hyun-Jeong Kang, Seoul (KR); Young-Bin Chang, Gyeonggi-do (KR); Suk-Won Kim, Gyeonggi-do (KR); Sang-Kyu Baek, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 261 days.

(21) Appl. No.: 14/266,555

(22) Filed: Apr. 30, 2014

(65) Prior Publication Data

US 2014/0323143 A1    Oct. 30, 2014

(30) Foreign Application Priority Data

Apr. 30, 2013    (KR) .......................... 10-2013-0048148

(51) Int. Cl.
*H04B 7/04*    (2017.01)
*H04B 7/06*    (2006.01)
(Continued)

(52) U.S. Cl.
CPC ......... *H04B 7/0408* (2013.01); *H04B 7/0617* (2013.01); *H04B 7/086* (2013.01);
(Continued)

(58) Field of Classification Search
CPC .... H04B 7/0408; H04B 7/086; H04B 7/0617; H04W 64/006; H04W 72/046; H04W 72/08; H04W 88/08

(Continued)

(56) References Cited

U.S. PATENT DOCUMENTS 5,341,147 A * 8/1994 Scott .................... H01Q 1/1257
342/174
7,117,014 B1 * 10/2006 Van Rensburg ..... H04B 7/0695
455/561

(Continued)

FOREIGN PATENT DOCUMENTS

WO    WO 2013/015636 A2    1/2013
WO    WO 2013/024942 A1    2/2013

OTHER PUBLICATIONS

International Search Report dated Aug. 21, 2014 in connection with International Patent Application No. PCT/KR2014/003873; 3 pages.

(Continued)

*Primary Examiner* — Michael Mapa

(57) ABSTRACT

A method of providing an optimal transmission or reception (Tx/Rx) beam in a beamforming system. The method includes receiving a reference signal and selecting an optimal Tx/Rx beam that guarantees an optimal channel environment based on the received reference signal determining a possibility of occurrence of a Tx/Rx beam mismatch between the selected optimal Tx/Rx beam and a Tx/Rx beam used for transmitting information on the selected optimal Tx/Rx beam; and when there is the possibility of the occurrence of the Tx/Rx beam mismatch, performing at least one of widening a beam width of the Tx/Rx beam, increasing a number of Tx/Rx beams, reducing a period of a beam selection operation for selecting the optimal Tx/Rx beam, and reducing a transmission period of the reference signal. Other embodiments including a beamforming system are also disclosed.

26 Claims, 16 Drawing Sheets

(51) Int. Cl.
| | |
|---|---|
| *H04B 7/08* | (2006.01) |
| *H04W 72/04* | (2009.01) |
| *H04W 88/08* | (2009.01) |
| *H04W 64/00* | (2009.01) |
| *H04W 72/08* | (2009.01) |
| *H04B 7/0408* | (2017.01) |
| *H04B 7/0404* | (2017.01) |

(52) U.S. Cl.
CPC ....... *H04W 64/006* (2013.01); *H04W 72/046* (2013.01); *H04W 88/08* (2013.01); *H04B 7/0404* (2013.01); *H04W 72/08* (2013.01)

(58) Field of Classification Search
USPC .................. 455/13.3, 24–25, 63.4, 418–420, 455/450–452.1, 562.1; 370/252, 278, 370/282, 329, 334; 375/267
See application file for complete search history.

(56) References Cited

U.S. PATENT DOCUMENTS

| | | | | |
|---|---|---|---|---|
| 7,663,542 | B1* | 2/2010 | Goodzeit | H01Q 1/288 342/359 |
| 8,594,053 | B2 | 11/2013 | Kim et al. | |
| 2002/0146983 | A1* | 10/2002 | Scherzer | H04W 16/28 455/67.11 |
| 2004/0137952 | A1 | 7/2004 | Umesh et al. | |
| 2005/0215289 | A1 | 9/2005 | Rensburg et al. | |
| 2006/0119503 | A1* | 6/2006 | Allen | G01S 7/4017 342/174 |
| 2010/0215027 | A1* | 8/2010 | Liu | H04B 7/0695 370/338 |
| 2012/0220238 | A1 | 8/2012 | Hosoya et al. | |
| 2012/0230380 | A1 | 9/2012 | Keusgen et al. | |
| 2013/0028186 | A1 | 1/2013 | Kim | |
| 2013/0039345 | A1* | 2/2013 | Kim | H04W 72/046 370/332 |
| 2013/0040681 | A1 | 2/2013 | Lee et al. | |
| 2013/0040682 | A1 | 2/2013 | Chang et al. | |
| 2013/0040684 | A1* | 2/2013 | Yu | H04B 7/0617 455/517 |
| 2013/0051364 | A1 | 2/2013 | Seol et al. | |
| 2013/0072243 | A1* | 3/2013 | Yu | H04B 7/0695 455/509 |
| 2013/0072247 | A1* | 3/2013 | Park | H04B 7/0408 455/513 |
| 2014/0003481 | A1 | 1/2014 | Keusgen et al. | |
| 2014/0056256 | A1 | 2/2014 | Kim et al. | |

OTHER PUBLICATIONS

Written Opinion of International Searching Authority dated Aug. 21, 2014 in connection with International Patent Application No. PCT/KR2014/003873; 5 pages.
Partial Supplementary European Search Report dated Oct. 27, 2016 in connection with European Application No. 14791212.5, 9 pages.
Foreign Communication From a Related Counterpart Application, European Application No. 14791212.5-1874, Extended European Search Report dated Feb. 21, 2017, 20 pages.

* cited by examiner

METHOD AND APPARATUS FOR PROVIDING OPTIMAL TRANSMISSION AND RECEPTION BEAMS IN BEAMFORMING SYSTEM

CROSS-REFERENCE TO RELATED APPLICATION AND CLAIM OF PRIORITY

The present application is related to and claims priority under 35 U.S.C. § 119(a) to Korean Application Serial No. 10-2013-0048148, which was filed in the Korean Intellectual Property Office on Apr. 30, 2013, the entire content of which is hereby incorporated by reference.

TECHNICAL FIELD

The present disclosure relates to a method and an apparatus for providing optimal transmission and reception beams in a beamforming communication system for supporting a beamforming scheme.

BACKGROUND

With the use of terminals, such as a smart phone and the like, an average amount of data used by mobile communication users has exponentially increased and users' demands for a higher data transmission rate also have continuously increased. A method of providing a generally high data transmission rate includes a method of providing a communication service using a wider frequency band and a method of increasing frequency usage efficiency. However, it is very difficult to provide a higher average data transmission rate through the method of increasing the frequency usage efficiency. It is because current communication technologies have already provided frequency usage efficiency close to a theoretical limit and further increasing the frequency usage efficiency through technology improvement is difficult.

Accordingly, providing the communication service through a wider frequency band is a realizable method of increasing the data transmission rate. At this time, it is required to consider an available frequency band. In view of the current frequency distribution policy, a band in which broadband communication of 1 GHz or more is possible is limited and a practically selectable frequency band is only the millimeter wave band of 30 GHz or more. In such a high frequency band, a base station using power equal to power used in a conventional cellular system has significantly reduced coverage in which a service is provided. In order to solve the above problem, a beamforming scheme that concentrates transmission or reception power in a narrow space to increase transmission or reception efficiency of an antenna is widely used.

SUMMARY

To address the above-discussed deficiencies, it is a primary object to provide a method and an apparatus for providing optimal Tx and Rx beams to each of a BS and a UE by solving a Tx/Rx beam mismatch problem in a beamforming system.

Further, the present disclosure provides a method and an apparatus for determining a possibility of the generation of the Tx/Rx beam mismatch in the beamforming system based on reciprocity between UL and DL and performing a proactive protection operation to prevent the generation of the Tx/Rx beam mismatch in advance.

In addition, the present disclosure provides a method and an apparatus for determining the generation of the Tx/Rx beam mismatch in the beamforming system and performing a reactive compensation operation based on reciprocity between UL and DL.

In accordance with an aspect of the present disclosure, a method of providing an optimal transmission or reception (Tx/Rx) beam in a beamforming system is provided. The method includes receiving a reference signal and selecting an optimal Tx/Rx beam that guarantees an optimal channel environment based on the received reference signal, determining a possibility of a generation of a Tx/Rx beam mismatch between the selected optimal Tx/Rx beam and a Tx/Rx beam used for transmitting information on the selected optimal Tx/Rx beam, and when there is the possibility of the generation of the Tx/Rx beam mismatch, performing at least one of an operation of widening a beam width of the Tx/Rx beam, an operation of increasing a number of Tx/Rx beams, an operation of reducing a period of a beam selection operation for selecting the optimal Tx/Rx beam, and an operation of reducing a transmission period of the reference signal.

In accordance with another aspect of the present disclosure, a method of providing an optimal transmission/reception (Tx/Rx) beam in a beamforming system is provided. The method includes receiving a reference signal and a control signal and selecting an optimal Tx/Rx beam that guarantees an optimal channel environment based on the received reference signal and control signal, determining whether a Tx/Rx beam mismatch occurs between the selected optimal Tx/Rx beam and a Tx/Rx beam used for transmitting information on the selected optimal Tx/Rx beam, when the Tx/Rx beam mismatch occurs, selecting a new Tx/Rx beam based on pre-received Tx/Rx beam information; and transmitting compensation information including at least one of information related to a User Equipment (UE) and information on the optimal Tx/Rx beam by using the new Tx/Rx beam.

In accordance with another aspect of the present disclosure, an apparatus for providing an optimal transmission/reception (Tx/Rx) beam in a beamforming system is provided. The apparatus includes: a receiver that receives a reference signal, and a controller that selects an optimal Tx/Rx beam that guarantees an optimal channel environment based on the received reference signal, determines a possibility of a generation of a Tx/Rx beam mismatch between the selected optimal Tx/Rx beam and a Tx/Rx beam used for transmitting information on the selected optimal Tx/Rx beam, and, when there is the possibility of the generation of the Tx/Rx beam mismatch, performs at least one of an operation of widening a beam width of the Tx/Rx beam, an operation of increasing a number of Tx/Rx beams, an operation of reducing a period of a beam selection operation for selecting the optimal Tx/Rx beam, and an operation of reducing a transmission period of the reference signal.

In accordance with another aspect of the present disclosure, an apparatus for providing an optimal transmission/reception (Tx/Rx) beam in a beamforming system is provided. The apparatus includes a receiver configured to receive a reference signal and a control signal, a controller configured to select an optimal Tx/Rx beam that guarantees an optimal channel environment based on the received reference signal and control signal, determine whether a Tx/Rx beam mismatch occurs between the selected optimal Tx/Rx beam and a Tx/Rx beam used for transmitting information on the selected optimal Tx/Rx beam, and select, when the Tx/Rx beam mismatch occurs, a new Tx/Rx beam based on pre-received Tx/Rx beam information, and a transmitter configured to transmit compensation information including at least one of information related to a User Equipment (UE) and information on the optimal Tx/Rx beam by using the new Tx/Rx beam.

According to the present disclosure, it is possible to prevent the occurrence of the Tx/Rx beam mismatch in advance by performing a proactive protection operation through determining beforehand a possibility of the generation of the UL and DL Tx/Rx beam mismatch. Further, even when the Tx/Rx beam mismatch occurs, an optimal Tx/Rx beam can be provided to each of the BS and the UE by performing a reactive compensation operation for each of the UL and the DL.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 6 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, exemplary embodiments of the present disclosure will be described in detail with reference to the accompanying drawings. Further, in the following description of the present disclosure, a detailed description of known functions and configurations incorporated herein will be omitted when it may make the subject matter of the present disclosure rather unclear. The terms which will be described below are terms defined in consideration of the functions in the present disclosure, and may be different according to users, intentions of the users, or customs. Accordingly, the terms should be defined based on the contents over the whole present specification.

Figure 1:
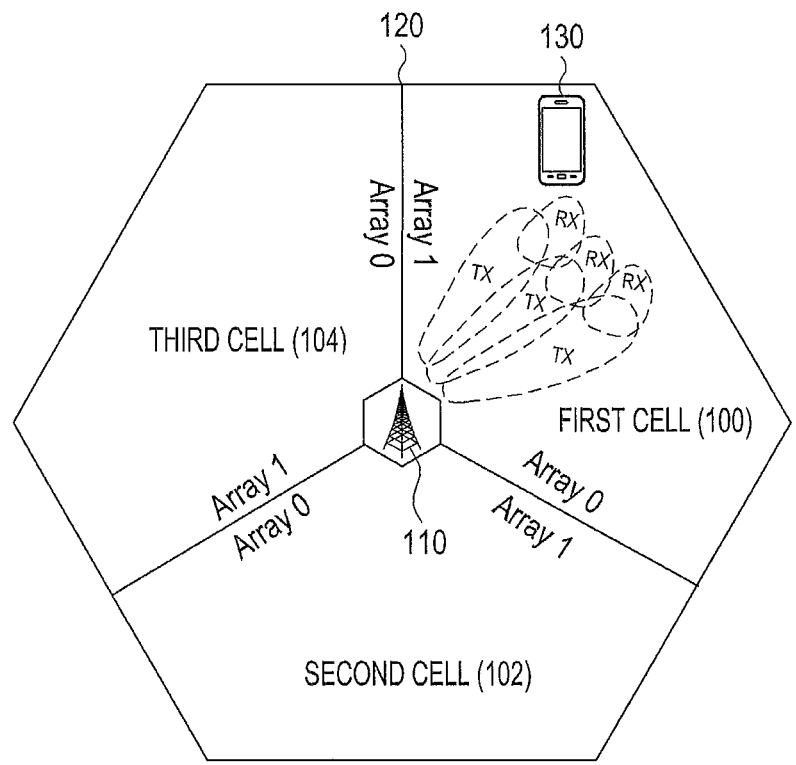
FIG. 1 illustrates an example in which a Base Station (BS) and a User Equipment (UE) select an optimal transmission/reception (Tx/Rx) beam in a beamforming system.

FIG. 1 illustrates an example in which a Base Station (BS) and a User Equipment (UE) select an optimal transmission or reception (Tx/Rx) beam in a beamforming system.

Referring to FIG. 1, it is assumed that a communication region 120 includes a first cell 100, a second cell 102, and a third cell 104, and a BS 110 transmits or receives data to or from a UE 130 by using a plurality of array antennas, that is, array 0 and array 1 in each cell. At this time, the BS 110 can transmit data while changing a direction of a downlink Transmission (Tx) beam and the UE 130 can receive data while changing a direction of a downlink Reception (Rx) beam.

In a beamforming system in which communication is performed using a beamforming scheme, the BS 110 and the UE 130 have a characteristic of selecting a Tx beam direction and an Rx beam direction that guarantee an optimal channel environment among various Tx beam directions and Rx beam directions to transmit or receive data. Such a characteristic is identically applied to an uplink channel in which the UE 130 transmits data to the BS 110 as well as a downlink channel in which the BS 110 transmits data to the UE 130.

For example, when it is assumed that a number of Tx beam directions which can be used by the BS 110 is N and a number of Rx beam directions which can be used by the UE 130 is M, a process of selecting an optimal downlink Tx/Rx beam direction (or beam) that guarantees an optimal channel environment is described below.

The BS 110 transmits prearranged signals, for example, reference signals by M times or more in N directions. The UE 130 receives the reference signals transmitted in the N directions by using Rx beams of M directions. In such a process, the BS 110 is required to transmit particular reference signals by at least N×M times and the UE 130 is required to receive the reference signals by N×M times and measure a reception strength of each of the received signals. Thereafter, each of the BS 110 and the UE 130 selects a Tx/Rx beam direction corresponding to a strongest measured value among the N×M measured values as an optimal Tx/Rx beam direction.

Particularly, in the above described process, a process in which the BS 110 transmits the signal in all available beam directions by one time or more and the UE 130 receives the signal in all available beam directions is referred to as a "beam sweeping process" and a process in which the UE 130 selects the optimal Tx/Rx beam direction is referred to as a "beam selection process". Further, although the process of selecting the optimal downlink Tx/Rx beam has been described herein, the Tx/Rx beam selecting process can be equally applied to the uplink. That is, the optimal uplink Tx/Rx beam is also selected by the same process as the aforementioned beam selecting process.

Figure 2:
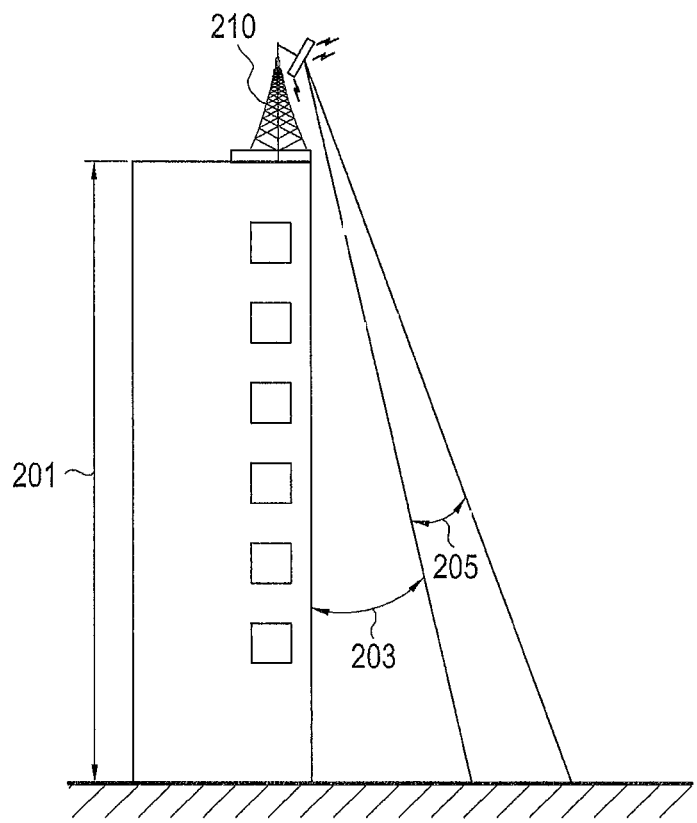
FIG. 2 illustrates an example in which a BS transmits/receives a signal through a beam having a specific beam width in the beamforming system.

FIG. 2 illustrates an example in which the BS transmits/receives a signal through a beam having a specific beam width in a beamforming system.

Referring to FIG. 2, it is assumed that a BS 210 is installed in a position of a particular height 201 and a beam transmitted from the BS has a predetermined beam width 202. The beam width of the BS can be defined with respect to each of an elevation angle and an azimuth and FIG. 2 illustrates that the BS 210 transmits/receives a signal through a beam corresponding to a particular elevation angle 203.

Figure 3:
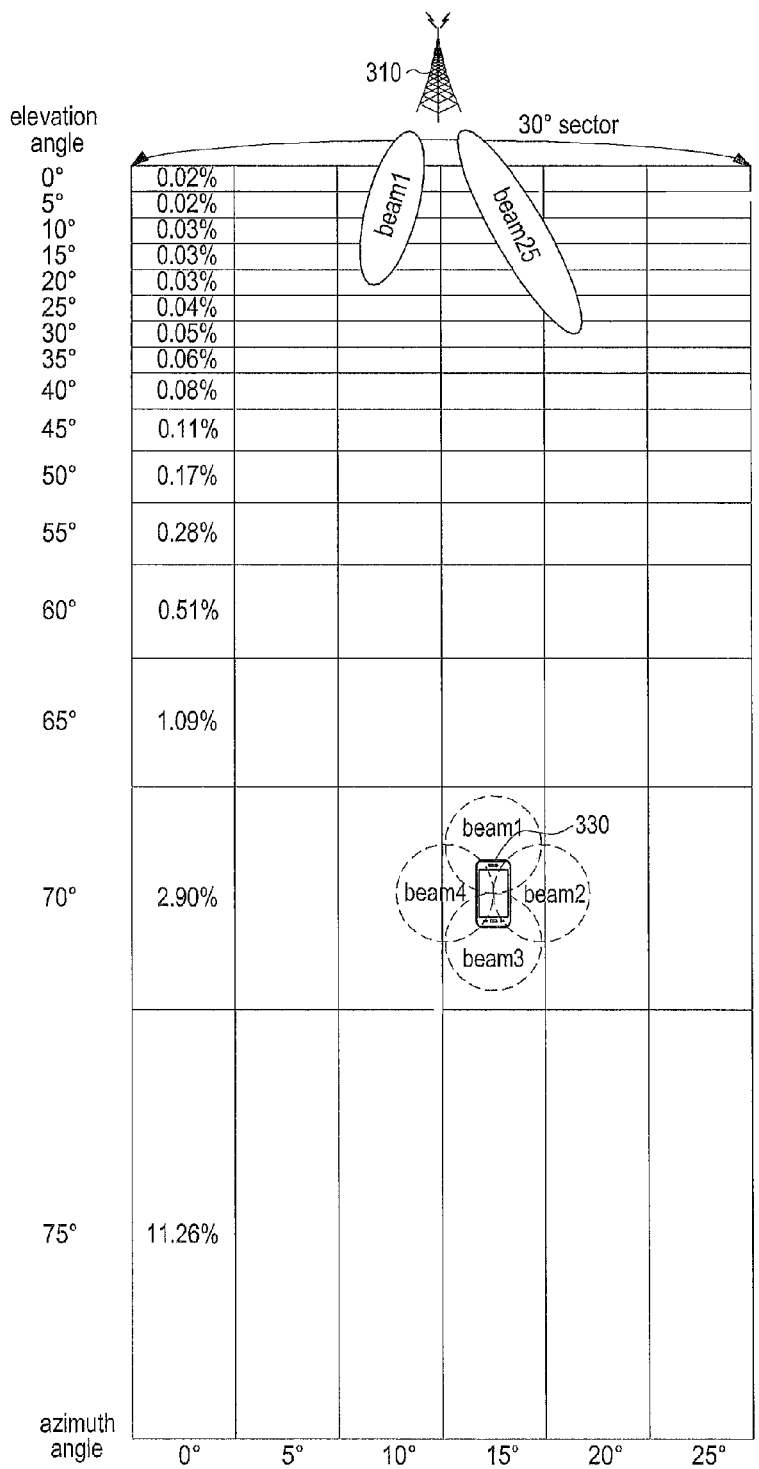
FIG. 3 illustrates an example of a Tx beam region in which a BS can transmit a Tx beam to downlink and an Rx beam region in which the BS can receive the Tx beam.

FIG. 3 illustrates an example of a Tx beam region in which the BS can transmit a Tx beam to the downlink and an Rx beam region in which the BS can receive the Tx beam in a beamforming system.

Referring to FIG. 3, it is assumed that a BS 310 is installed in a position of a height of 35 m and the BS 310 transmits a Tx beam having a beam width of 5 degrees with respect to each of the elevation angle and the azimuth within a sector having an angle of 30 degrees and a coverage of 200 m in the same way as illustrated in FIG. 2.

That is, an example of FIG. 3 illustrates a case where a sector having an angle of 30 degrees and a coverage of 200 m is configured using 96 Tx beams having a beam width of 5 degrees with respect to each of the elevation angle and the azimuth. When there is no obstacle, the Tx beams transmitted by the BS 310 are spread and transmitted with a fan shape. However, in the example of FIG. 3, it is assumed that each of the Tx beams reaches the ground with a rectangular shape for the convenience of description.

The shown rectangles are shown by 96 regions and indicates the ground which Tx beams having a particular azimuth and elevation angle reach. The 96 Tx beams are transmitted to a region farther from the BS 310 as the elevation angle is larger and a Tx beam transmitted to a region farther from the BS 310 is received in a wider region. A ratio % belonging to each of the shown rectangles indicates a ratio of an area which a reception region receiving the Tx beam transmitted to the corresponding position occupies in a total number of 96 regions. As illustrated in FIG. 3, a Tx beam transmitted to a boundary region of the BS 310 is received in a very wide region in comparison with a Tx beam transmitted to a center region of the BS 310 even though the Tx beams have the same elevation angle and azimuth. In the example of FIG. 3, the reception region of the Tx beam transmitted to the boundary region and the reception region of the Tx beam transmitted to the center region has an area difference of a maximum of 480 times.

In the beam forming system, the UE has a difficulty in forming a number of transmission/reception beams having a narrow beam width generally like the base station, due to limitations on a physical space, capability, price and the like. The example of FIG. 3 assumes a case where a UE 330 forms four Rx beams (beam 1, beam 2, beam 3, and beam 4) and receives the Tx beam of the BS 310 by using one of the formed four Rx beams. In this case, a beam width according to an azimuth of each of the Rx beams has approximately about 90 degrees.

As illustrated in the example of FIG. 3, when a Tx beam having a narrow beam width, that is, a small elevation angle and a small azimuth is used, a large number of Tx beam regions and Rx beam regions exist within the BS coverage. Particularly, when a downlink synchronization channel signal and broadcast control channel signals transmitted in a beam sweeping scheme are transmitted using the Tx beam having the narrow beam width, that is, a narrow Tx beam as illustrated in the example of FIG. 3, the BS 310 should transmit the signal repeatedly a minimum of 96 times in all available transmission beam directions within the BS coverage and each of the beam directions is used once or more. As described above, a number of times by which the downlink synchronization signal and the broadcast control channel signals are transmitted in the beam sweeping scheme is proportional to a number of Tx beams transmitted within the BS coverage. Accordingly, in order to reduce transmission overheads due to the downlink synchronization signal and the broadcast control channel signals, a method of supporting communication of a BS coverage region by a smaller number of Tx beams is required. Further, to this end, it is advantageous to use a Tx beam having a wide beam width, that is, a wide Tx beam rather than a narrow Tx beam.

However, in general, as a beam width becomes wider, a beamforming effect decreases. Further, when the beam width becomes narrower to increase the beamforming effect, a number of Tx beams required for supporting the BS coverage increases, so that the transmission overheads due to the downlink synchronization signal and the broadcast control channel signals increase. As described above, the beamforming effect and the transmission overheads due to the downlink synchronization signal and the broadcast control channel signals have a trade off relationship therebetween.

In order to effectively solve the above problem, a method of diversifying a Tx beam width used for transmitting the broadcast channel signal and a Tx beam width used for transmitting user data is generally used. For example, in a sector having an angle of 60 degrees, the BS transmits the broadcast channel signal by using a Tx beam having a beam width of 30 degrees and transmits the user data by using a Tx beam having a beam width of 10 degrees. Hereinafter, the beam having the wide beam width is defined as a "wide beam" or a "coarse beam" and the beam having the narrow beam width is defined as a "narrow beam" or a "fine beam".

The UE selects a beam by using a downlink reference signal transmitted to the wide beam or the narrow beam. Further, in order to receive data from the BS, the UE reports information on one or more downlink Tx beams selected during the beam selecting process and a reception capability of a downlink radio channel measured in the process to the BS. At this time, since the beamforming should be also applied to the uplink, the BS and the UE are required to separately perform a beam selecting process for the uplink.

The example of FIG. 3 has described the downlink beamforming as an example. However, it goes without saying that all examples of FIG. 3 can be equally applied to the uplink.

Figure 4:
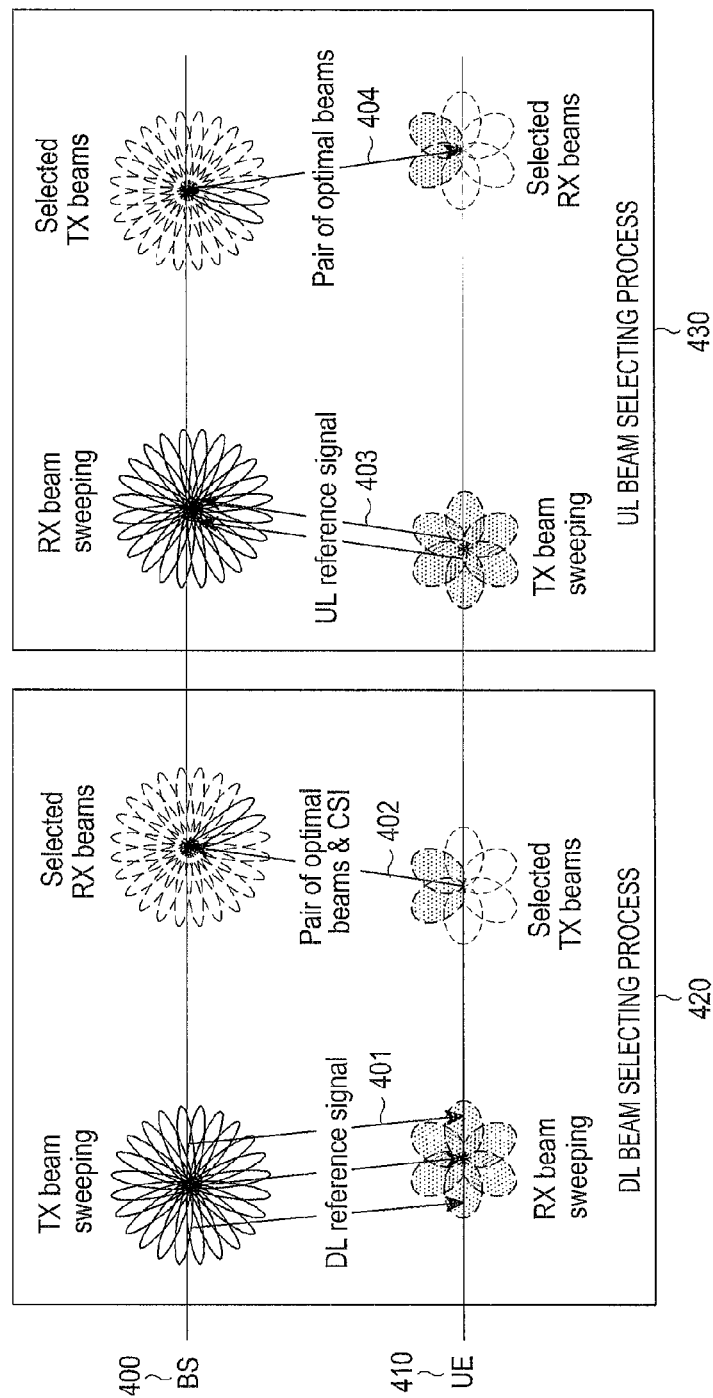
FIG. 4 illustrates a process of selecting a beam in the downlink/uplink and a process of exchanging information on the selected beam in a beamforming system.

FIG. 4 illustrates a process of selecting a beam in downlink or uplink and a process of exchanging information on the selected beam in the beamforming system.

Referring to FIG. 4, a downlink beam selecting process 420 and an uplink beam selecting process 430 are distinguished from each other.

In the downlink beam selecting process 420, a BS 400 transmits DownLink (DL) reference signals through a beam sweeping process and a UE 410 receives the DL reference signals through a beam sweeping process in step 401. The UE 410 selects an optimal DL Tx beam and Rx beam (or a pair of optimal Tx and Rx beams) based on the received reference signals and reports information on the selected pair of optimal Tx and Rx beams, for example, a beam index and Channel State Information (CSI) indicating a reception capability of a radio channel to the BS 400 in step 402.

In the uplink beam selecting process 430, the UE 410 transmits UpLink (UL) reference signals through a beam sweeping process and the BS 400 receives the UL reference signals through a beam sweeping process in step 403. The BS 400 selects a pair of optimal UL Tx and Rx beams based on the received reference signals and reports an index of the selected pair of optimal Tx and Rx beams to the UE 410 through a control channel, for example, a Physical Downlink Control CHannel (PDCCH) in step 404.

That is, a result of the beam selection for the DL by the UE 410, that is, information on the pair of optimal DL Tx and Rx beams is transmitted to the BS 400 through the UL and a result of the beam selection for the UL by the BS 400, that is, information on the optimal UL Tx and RX beams is transmitted to the UE 410 through the DL.

Meanwhile, when the UE 410 initially establishes communication with the BS 400, the UE 410 is required to simultaneously perform the beam selection processes for both the DL and the UL. In this case, although the UE 410 should transmit the beam selection result for the DL to the BS 400 through UL, the beam selecting process for the UL has not been completed, so that the UE 410 has a difficulty in transmitting the beam selection result to the BS 400. Similarly, although the BS 400 should transmit the beam selection result for the UL to the UE 410 through the DL, the beam selecting process for the DL has not been completed, so that the BS 400 has a difficulty in transmitting the beam selection result to the UE 410. In order to solve the above problem, it can be assumed that information to be transmitted is transmitted using all available pairs of Tx and Rx beams in the initial establishment of the communication in steps 402 and 404.

Further, the illustrated beam selecting process is normally performed for a UE having general mobility. However, due to a very fast speed of the UE or sudden appearance of obstacles, capabilities of used Tx and Rx beams can simultaneously deteriorate or the Tx and Rx beams can be simultaneously blocked in steps 402 and 404. In this case, a mismatch between the optimal Tx and Rx beams determined in steps 401 and 403 and the Tx and Rx beams used for actual transmission or reception in steps 402 and 404 occurs. Further, due to the Tx/Rx beam mismatch, the information on the optimal Tx and Rx beams determined in steps 401 and 403 cannot be transmitted to the BS 400 and the UE 410.

Figure 5A:
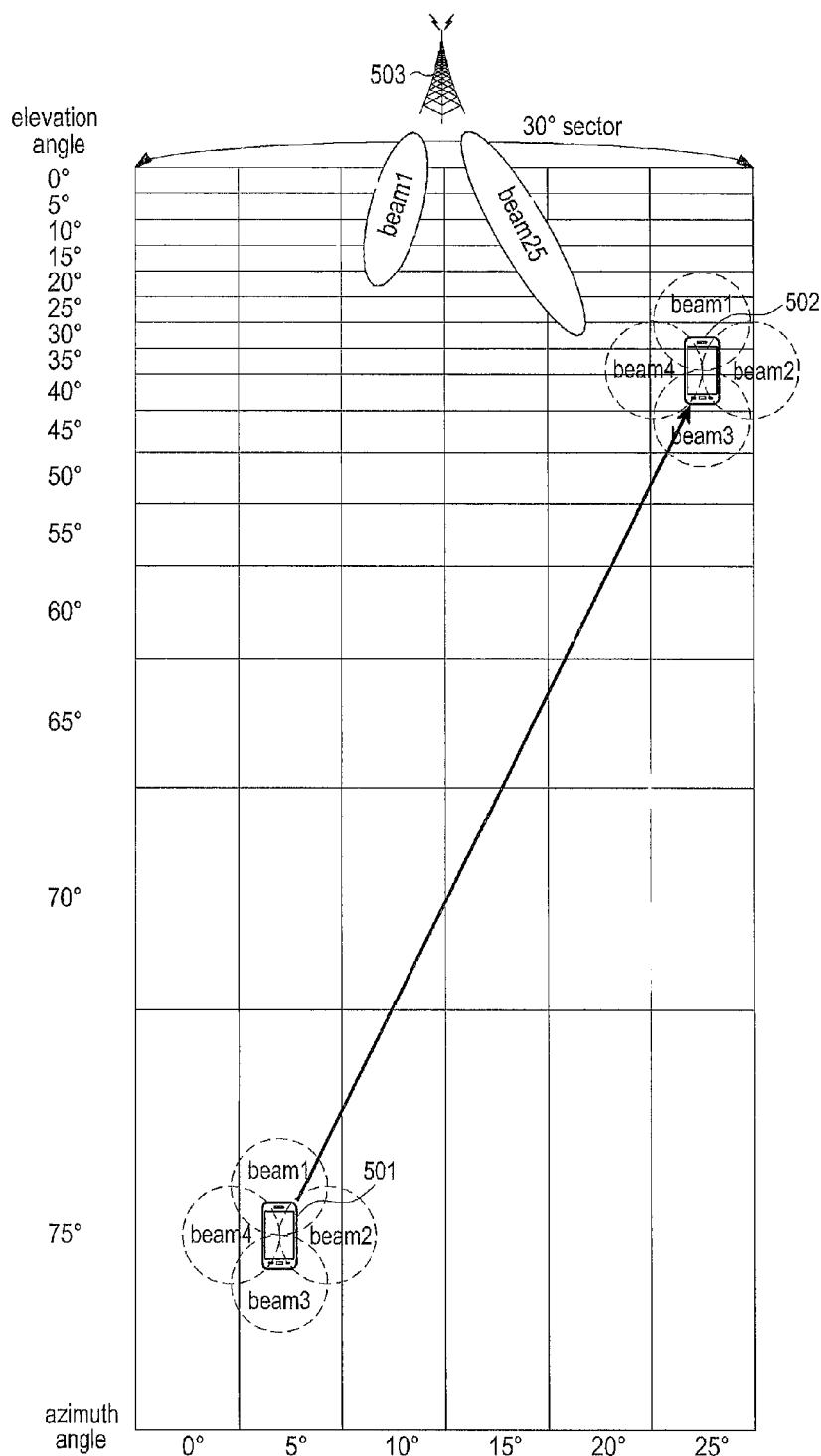
FIG. 5A illustrates an example where a Tx/Rx beam mismatch occurs by an increase in a movement speed of a UE and a rapid change in a channel environment in the beamforming system.

FIG. 5A illustrates an example where a Tx/Rx beam mismatch occurs by an increase in a movement speed of the UE and a rapid change in a channel environment in the beamforming system.

Referring to FIG. 5A, it is assumed that a UE, located at a position 501, receives a DL signal by using BS_Tx beam 1 and UE_Rx beam 1 corresponding to a pair of optimal DL Tx and Rx beams and a BS 503 receives a UL signal by using UE_Tx beam 1 and BS_Rx beam 1 corresponding to a pair of optimal UL Tx and Rx beams.

When the UE located at the position 501 moves to a position 502 at very fast speed or a channel environment around the UE is rapidly changed, the pair of optimal DL Tx and Rx beams (BS_Tx beam 1 and UE_Rx beam 1) are not the optimal Tx and Rx beams any more. At this time, the UE located at the position 502 can select a new pair of optimal DL Tx and Rx beams, for example, BS_Tx beam 25 and UE_Rx beam 4 by re-performing the DL Tx/Rx beam selecting process. However, when information on the new pair of optimal DL Tx and Rx beams is transmitted through the pair of optimal UL Tx and Rx beams (UE_Tx beam 1 and BS_Rx beam 1) used in the position 501, the BS 503 may not receive the information on the new pair of optimal DL Tx and Rx beams.

Similarly, the BS 503 can select a new pair of optimal UL Tx and RX beams, for example, UE_Tx beam 4 and BS_Rx beam 25 for the UE located at the position 502. However, when information on the new pair of optimal UL Tx and Rx beams is transmitted through the pair of optimal DL Tx and Rx beams (BS_Tx beam 1 and UE_Rx beam 1) used in the position 501, the UE located at the position 502 may also not receive the information on the new pair of optimal DL Tx and Rx beams.

Figure 5B:
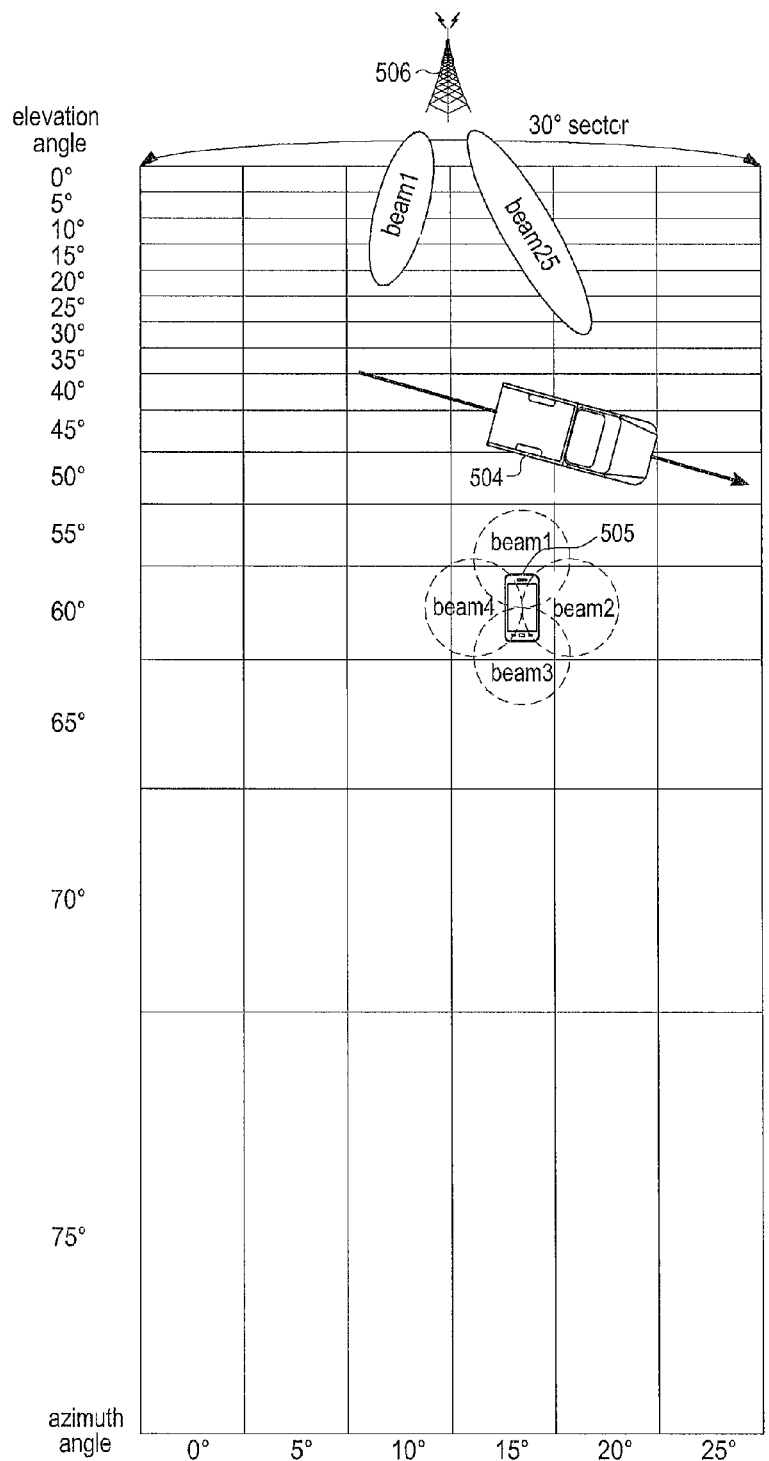
FIG. 5B illustrates an example in which a Tx/Rx beam mismatch occurs due to an appearance of obstacles in the beamforming system.

FIG. 5B illustrates an example in which a Tx/Rx beam mismatch occurs due to an appearance of obstacles in the beamforming system.

Referring to FIG. 5B, it is assumed that a UE located at a position 505 receives a DL signal by using BS_Tx beam 25 and UE_Rx beam 1 corresponding to a pair of optimal DL Tx and Rx beams and a BS 506 receives a UL signal by using UE_Tx beam 1 and BS_Rx beam 25 corresponding to a pair of optimal UL Tx and Rx beams.

When obstacles 504 interrupt communication between the UE located at the position 505 and the BS 506, the pair of optimal DL Tx and Rx beams (BS_Tx beam 25 and UE_Rx beam 1) are not the optimal Tx and Rx beams any more. At this time, the UE located at the position 505 can select a new pair of optimal DL Tx and Rx beams, for example, BS_Tx beam 1 and UE_Rx beam 4 by re-performing the DL Tx/Rx beam selecting process. However, when information on the new pair of optimal DL Tx and Rx beams is transmitted through the pair of optimal UL Tx and Rx beams (UE_Tx beam 1 and BS_Rx beam 25), the BS 506 may not receive the information on the new pair of optimal DL Tx and Rx beams.

Similarly, the BS 506 can select a new pair of optimal UL Tx and RX beams, for example, UE_Tx beam 4 and BS_Rx beam 1 for the UE located at the position 505. However, when information on the new pair of optimal UL Tx and Rx beams is transmitted through the pair of optimal DL Tx and Rx beams (BS_Tx beam 25 and UE_Rx beam 1), the UE may also not receive the information on the new pair of optimal DL Tx and Rx beams.

As described above, when the Tx and Rx beam mismatch problem occurs, each of the UE and the BS can select a new pair of optimal Tx and Rx beams for the DL and the UL. However, in order to exchange information on the new pair of optimal Tx and Rx beams between the UE and BS, the new pair of optimal Tx and Rx beams should be repeatedly transmitted using all available pairs of Tx and Rx beams through the beam sweeping process. Further, the above problem causes an unnecessary delay in the process of exchanging the new pair of optimal Tx and Rx beams and thus hinders service continuity.

Figure 6:
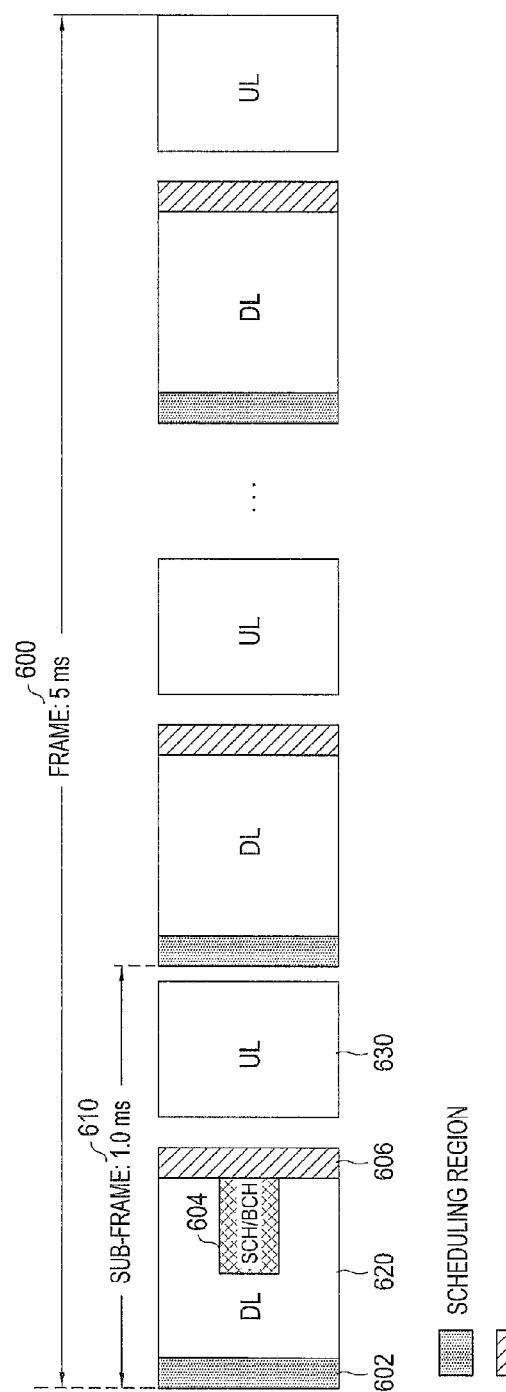
FIG. 6 illustrates an example of a frame structure used for transmitting or receiving a signal in the beamforming system according to an embodiment of the present disclosure.

FIG. 6 illustrates an example of a frame structure used for transmitting/receiving a signal in a beamforming system according to an embodiment of the present disclosure.

Referring to FIG. 6, a frame 600 has a length of 5 ms and includes five sub-frames. The each sub-frame having a length of 1 ms, for example, a sub-frame 610 includes a DL sub-frame 620 used if the BS transmits a DL signal to the UE and a UL sub-frame 630 used if the UE transmits a signal to the BS.

The DL sub-frame 620 includes a scheduling region 602, a Synchronous CHannel (SCH)/Broadcasting CHannel (BCH) region 604, and a reference signal region 606. Scheduling information is transmitted in the scheduling region 602, an SCH signal and a BCH signal are transmitted in the SCH/BCH region 604, and a reference signal is transmitted in the reference signal region 606. Particularly, the SCH/BCH region 604 is included only in first sub-frame 610 among the sub-frames included in the frame 600.

Hereinafter, an embodiment of the present disclosure will be described in more detail with reference to FIGS. 7 to 14. Prior to the description of the embodiment of the present disclosure, a method of providing an optimal Tx/Rx beam to each of the BS and the UE provided by the present disclosure will be briefly described below. The method of providing the optimal Tx/Rx beam provided by the present disclosure will be described by two methods including a proactive protection method and a reactive compensation method.

(1) Proactive Protection Method

Each of the BS and the UE determines a possibility of the occurrence of the mismatch between an optimal Tx/Rx beam selected based on received reference signals and a Tx/Rx beam actually used for transmitting information on the selected optimal Tx/Rx beam. When the BS and the UE determine that there is the possibility of the occurrence of the Tx/Rx beam mismatch, the BS and the UE perform a proactive protection operation for each of UL and DL. The operation in which each of the BS and the UE determines the possibility of the occurrence of the Tx/Rx beam mismatch will be described later in more detail with reference to FIGS. 7 and 11.

The proactive protection operation refers to an operation which each of the BS and the UE performs to prevent the occurrence of the Tx/Rx beam mismatch in advance. That is, the proactive protection operation can be performed using at least one of a method of increasing a diversity effect by widening a width of a Tx/Rx beam and increasing a number of Tx/Rx beams, a method of reducing a period of a Tx/Rx beam selecting operation for selecting an optimal Tx/Rx beam, and a method of reducing a transmission period of a reference signal.

(2) Reactive Compensation Method

Each of the BS and the UE determines whether the mismatch occurs between an optimal Tx/Rx beam selected based on received reference signals and a Tx/Rx beam actually used for transmitting information on the selected optimal Tx/Rx beam. If the Tx/Rx beam mismatch occurs, the BS and the UE perform a reactive compensation operation for each of UL and DL. The operation in which each of the BS and the UE determines whether the Tx/Rx beam mismatch occurs will be described in more detail with reference to FIGS. 8 to 10 and FIGS. 12 to 14 described later.

The reactive compensation operation refers to an operation in which each of the BS and the UE performs to compensate the Tx/Rx beam mismatch when the Tx/Rx beam mismatch occurs.

That is, If the Tx/Rx beam mismatch occurs, based on an assumption of the reciprocity between the UL and the DL, the BS selects a new DL Tx/Rx beam based on pre-received UL Tx/Rx beam information and transmits compensation information including an identifier of the UE and optimal UL Tx/Rx beam information to the UE by using the selected DL Tx/Rx beam. Further, the BS can repeatedly perform an operation of transmitting the compensation information to the UE until the BS receives a response message of the compensation information from the UE or transmits the compensation information in all available Tx beam directions.

Alternatively, the BS can configure and transmit the compensation information including the identifier of the UE and the optimal UL Tx/Rx beam information in primary and secondary BCH regions of a DL sub-frame.

If the Tx/Rx beam mismatch occurs, based on an assumption of the reciprocity between the UL and the DL, the UE selects a new UL Tx/Rx beam based on received DL Tx/Rx beam information and transmits compensation information including an identifier of the UE and optimal DL Tx/Rx beam information to the BS by using the selected UL Tx/Rx beam. Further, the UE can repeatedly perform an operation of transmitting the compensation information to the BS until the UE receives a response message of the compensation information from the BS or transmits the compensation information in all available Tx beam directions.

Figure 7:
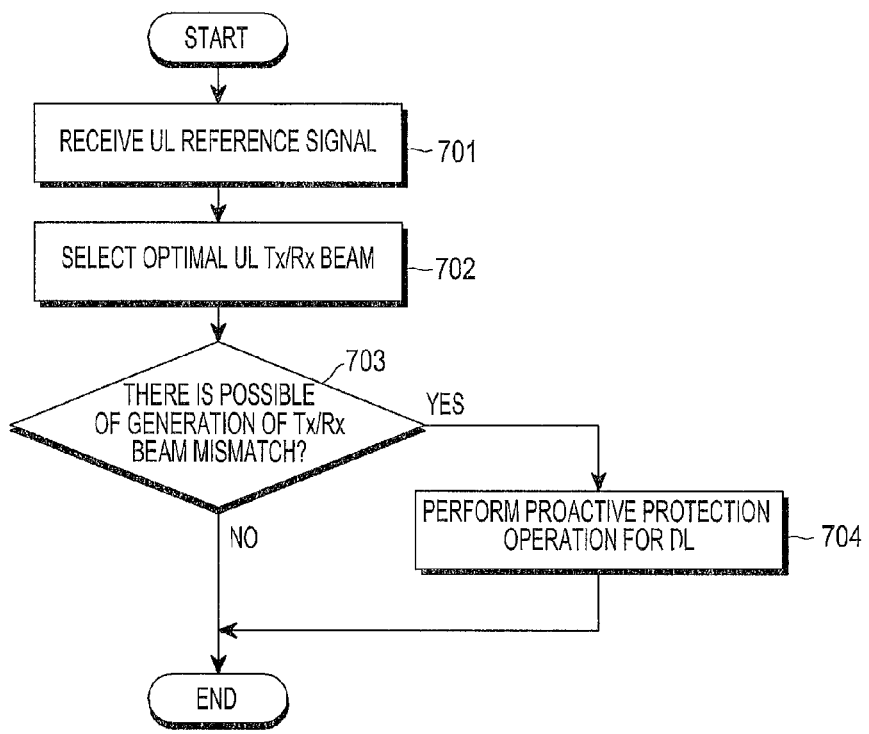
FIG. 7 is a flowchart illustrating an example in which a BS determines a possibility of the generation of the Tx/Rx beam mismatch in the beamforming system and performs a proactive protection operation according to an embodiment of the present disclosure.

FIG. 7 is a flowchart illustrating an example in which the BS determines a possibility of the occurrence of the Tx/Rx beam mismatch and performs the proactive protection operation in the beamforming system according to an embodiment of the present disclosure.

Referring to FIG. 7, it is assumed that the BS determines the possibility of the occurrence of the Tx/Rx beam mismatch in particular sub-frame n.

The BS receives a UL reference signal from the UE in step 701 and proceeds to step 702. The BS selects an optimal UL Tx/Rx beam by performing a UL Tx/Rx beam selecting operation for the UE periodically or aperiodically based on the received UL reference signal in step 702 and proceeds to step 703.

In step 703, the BS determines whether there is the possibility of the occurrence of the Tx/Rx beam mismatch between the selected optimal UL Tx/Rx beam and a UL Tx/Rx beam actually used for transmitting information on the optimal UL Tx/Rx beam. For example, as a result of the Tx/Rx beam selecting operation, if an optimal UL Tx/Rx beam having a capability equal to or larger than a particular threshold, for example, threshold 1 is different from a previously selected optimal UL Tx/Rx beam and the previously selected optimal UL Tx/Rx beam has a capability equal to or smaller than a particular threshold, for example, threshold 2, the BS determines that a rapid change has occurred in a UL channel environment and determines that there is the possibility of the occurrence of the UL Tx/Rx beam mismatch. The capability of the optimal UL Tx/Rx beam can be measured by a Received Signal Strength Indication (RSSI), a Signal to Interference-plus-Noise Ratio (SINR) or the like. Further, although it has been described as an example that the BS determines that there is the possibility of the occurrence of the UL Tx/Rx beam mismatch, the BS can also determine that there is a possibility of the occurrence of the DL Tx/Rx beam mismatch by the reciprocity.

Further, if a frequency with which the optimal UL Tx/Rx beam is changed per second is equal to or larger than a particular value, for example, K or a movement speed of the UE is equal to or larger than a particular value, for example, v (km/h), the BS determines that there is a possible of the occurrence of the DL Tx/Rx beam mismatch. The movement speed of the UE can be measured based on a positioning system such as a Global Positioning System (GPS) or based on a channel state change between the BS and the UE or a number of handovers per hour.

When the BS determines that there is the possibility of the occurrence of the Tx/Rx beam mismatch in step 703, the BS performs the proactive protection operation for the DL in step 704. That is, the BS increases a diversity effect by widening a width of the DL Tx/Rx beam or increasing a number of Tx/Rx beams to prevent the Tx/Rx beam mismatch in advance. Alternatively, the BS reduces a period of the Tx/Rx beam selecting operation for selecting the optimal UL Tx/Rx beam or reduces a transmission period of the DL reference signal to prevent the Tx/Rx beam mismatch in advance.

Meanwhile, when the BS determines that there is no possibility of the occurrence of the Tx/Rx beam mismatch in step 703, the BS ends the operation being currently performed.

Figure 8:
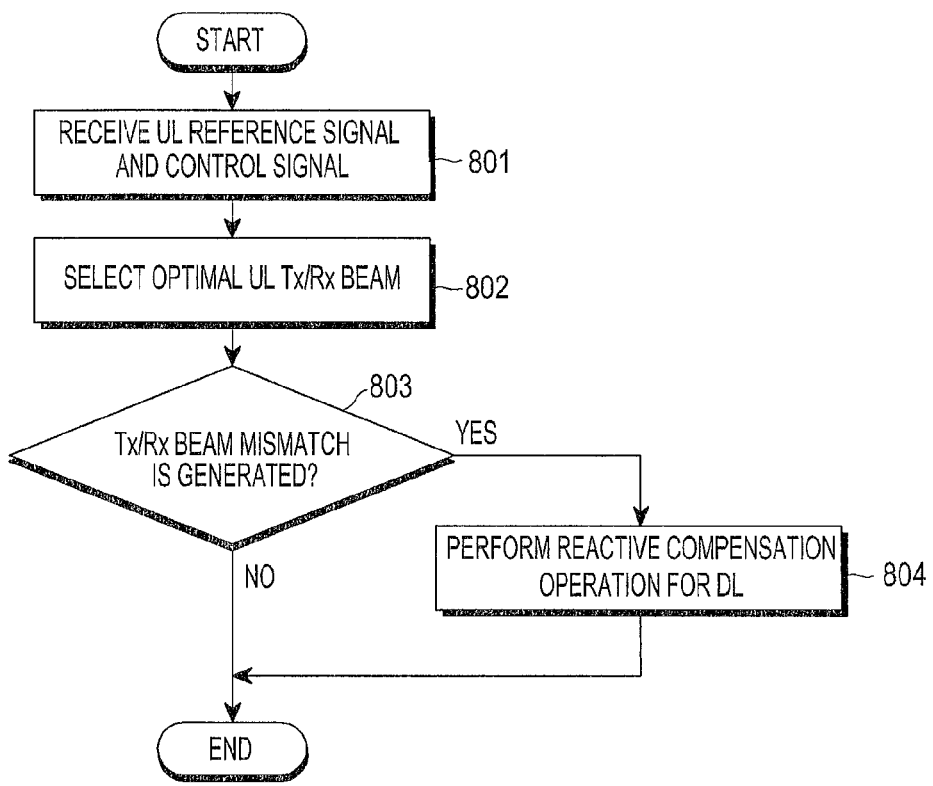
FIG. 8 is a flowchart illustrating an example in which a BS determines a possibility of the generation of the Tx/Rx beam mismatch in the beamforming system and performs a reactive compensation operation according to an embodiment of the present disclosure.

FIG. 8 is a flowchart illustrating an example in which the BS determines a possibility of the occurrence of the Tx/Rx beam mismatch and performs the reactive compensation operation in the beamforming system according to an embodiment of the present disclosure.

Referring to FIG. 8, it is assumed that the BS determines the possibility of the occurrence of the Tx/Rx beam mismatch in a particular sub-frame n.

The BS receives a UL reference signal and a control signal from the UE in step 801 and proceeds to step 802. The BS selects an optimal UL Tx/Rx beam by performing a UL Tx/Rx beam selecting operation for the UE periodically or aperiodically based on the received UL reference signal and control signal in step 802 and proceeds to step 803.

In step 803, the BS determines whether the Tx/Rx beam mismatch occurs between the selected optimal UL Tx/Rx beam and a UL Tx/Rx beam actually used for transmitting information on the optimal UL Tx/Rx beam. For example, if the selected optimal UL Tx/Rx beam has a capability of a particular threshold, for example, a capability equal to or larger than threshold 3 and the BS has not received Channel Status Information (CSI) measured and reported for the DL channel by the UE or optimal Tx/Rx beam information selected for the DL channel by the UE for a particular time, the BS determines that the UL Tx/Rx beam mismatch occurs. Further, if the selected optimal UL Tx/Rx beam has a capability equal to or larger than threshold 3 and the BS has not continuously received an ACKnowledgement (ACK) message of a control signal or data transmitted to the UE by a predetermined number of times or more, the BS determines that the UL Tx/Rx beam mismatch occurs. The capability of the optimal UL Tx/Rx beam can be measured by an RSSI, an SINR or the like. Further, although it has been described as an example that the BS determines that the UL Tx/Rx beam mismatch occurs, the BS can also determine that the DL Tx/Rx beam mismatch occurs by the reciprocity.

When the BS determines that the Tx/Rx beam mismatch occurs in step 803, the BS performs the reactive compensation operation for the DL in step 804. The reactive compensation operation will be described in more detail with reference to FIGS. 9 and 10 described later.

Meanwhile, when the BS determines that the Tx/Rx beam mismatch does not occurred in step 803, the BS ends the operation being currently performed.

Figure 9:
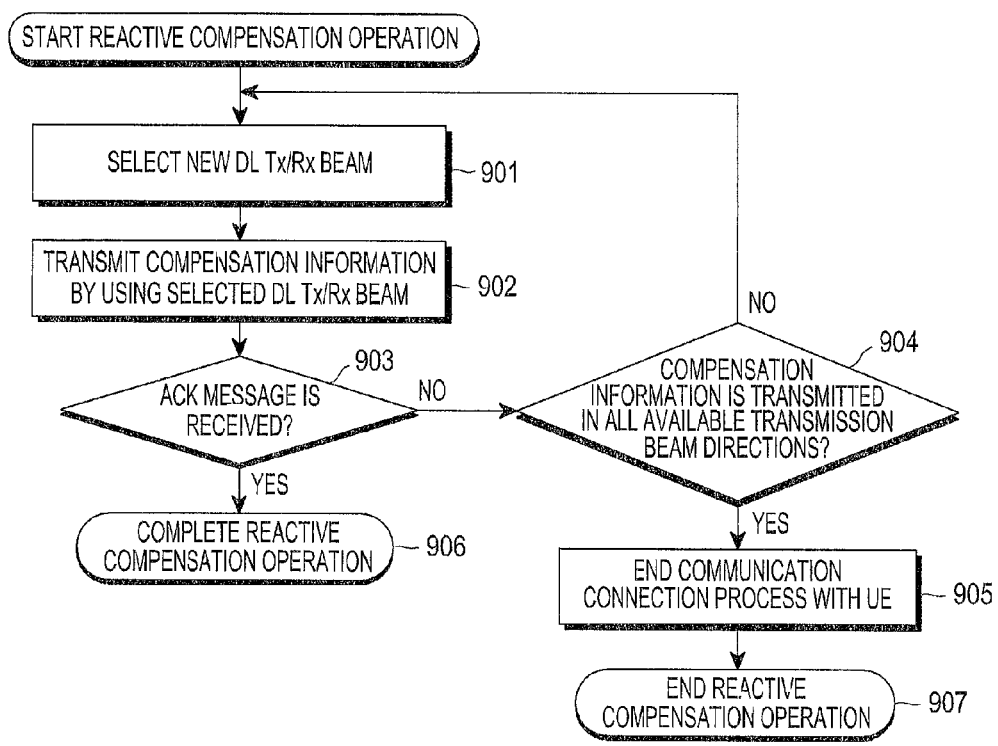
FIG. 9 is a flowchart illustrating an example in which a BS performs a reactive compensation operation in the beamforming system according to an embodiment of the present disclosure.

FIG. 9 is a flowchart illustrating an example in which the BS performs the reactive compensation operation in the beamforming system according to an embodiment of the present disclosure.

Referring to FIG. 9, the description of the reactive compensation operation described below corresponds to a more detailed description of step 804 of FIG. 8 and the reactive compensation operation can refer to a reactive compensation operation in a case where the BS determines that the Tx/Rx beam mismatch occurs in particular sub-frame n.

Based on an assumption of the reciprocity between the UL and the DL, the BS selects a new DL Tx/Rx beam based on UL Tx/Rx beam information pre-received from the UE in step 901 and proceeds to step 902. For example, the BS can select a DL Tx/Rx beam corresponding to a Tx/Rx beam having a most excellent reception capability among UL Tx/Rx beams received from the UE.

The BS transmits compensation information through a scheduling channel or a control channel by using the selected DL Tx/Rx beam in step 902 and proceeds to step 903. The compensation information includes an identifier of the UE and an optimal UL Tx/Rx beam index.

In step 903, the BS determines whether an ACK message of the compensation information transmitted in step 902 is received from the UE. If the ACK message is received, the BS proceeds to step 906 to complete the reactive compensation operation being performed.

Meanwhile, if the ACK message of the compensation information transmitted in step 902 is not received from the UE in step 903, the BS proceeds to step 904. The BS determines whether the compensation information is transmitted in all available transmission beam directions in step 904. When the compensation information is transmitted in all available transmission beam directions, the BS ends a communication connection process with the UE in step 905. Thereafter, the BS ends the reactive compensation operation in step 907.

However, when the compensation information cannot be transmitted in all available transmission beam directions in step 904, the BS proceeds to step 901 to select a new DL Tx/Rx beam which has not been previously selected and re-performs steps 902 and 903.

Figure 10:
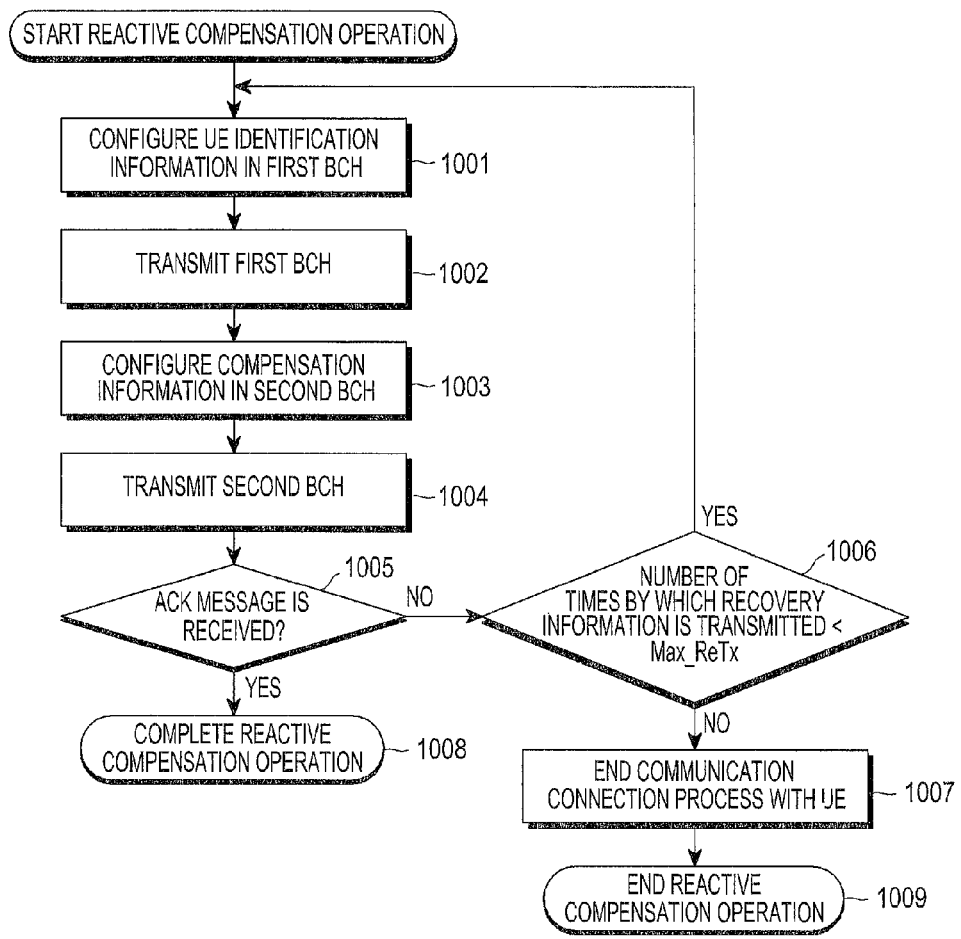
FIG. 10 is a flowchart illustrating an example in which a BS performs a reactive compensation operation in the beamforming system according to another embodiment of the present disclosure.

FIG. 10 is a flowchart illustrating an example in which the BS performs the reactive compensation operation in the beamforming system according to another embodiment of the present disclosure.

Referring to FIG. 10, the description of the reactive compensation operation described below corresponds to a more detailed description of step 804 of FIG. 8 and the reactive compensation operation can refer to a reactive compensation operation in a case where the BS determines that the Tx/Rx beam mismatch occurs in particular sub-frame n.

The BS configures an identifier of the UE, information derived from the identifier of the UE, or information related to the identifier of the UE in a primary BCH region of the DL sub-frame in step 1001 and proceeds to step 1002. For example, the BS sets a bit corresponding to the identifier of the UE as "1" among bits included in a bitmap including the primary BCH region. The BS transmits a primary BCH signal including the configured bitmap to the UE in step 1002 and proceeds to step 1003.

The BS configures compensation information in a secondary BCH region of the DL sub-frame in step 1003 and proceeds to step 1004. For example, the BS configures more detailed information indicating the identifier of the UE and an index of the optimal UL Tx/Rx beam in the secondary BCH region. The BS transmits a secondary BCH signal including the more detailed information indicating the identifier of the UE and the index of the optimal UL Tx/Rx beam to the UE in step 1004 and proceeds to step 1005.

In step 1005, the BS determines whether a response message of the compensation information transmitted through the secondary BCH signal is received from the UE. The response message can be, for example, an ACK message of the transmitted compensation information or a message including information on the optimal DL Tx/Rx beam. If the response message is received in step 1005, the BS proceeds to step 1008 to complete the reactive compensation operation being performed.

Meanwhile, if the response message is not received from the UE 1005, the BS proceeds to step 1006. The BS determines whether a number of times by which the compensation information is transmitted is smaller than a preset maximum retransmission number (MAX ReTX) in step 1006. If the number of times by which the compensation information is transmitted is smaller than MAX_RxTX, the BS proceeds to step 1001 and re-performs steps 1001 to 1004. However, when the number of times by which the compensation information is transmitted is equal to or larger than MAX_RxTX in step 1006, the BS proceeds to step 1007 to end the communication connection process with the UE. Thereafter, the BS ends the reactive compensation operation in step 1009.

Figure 11:
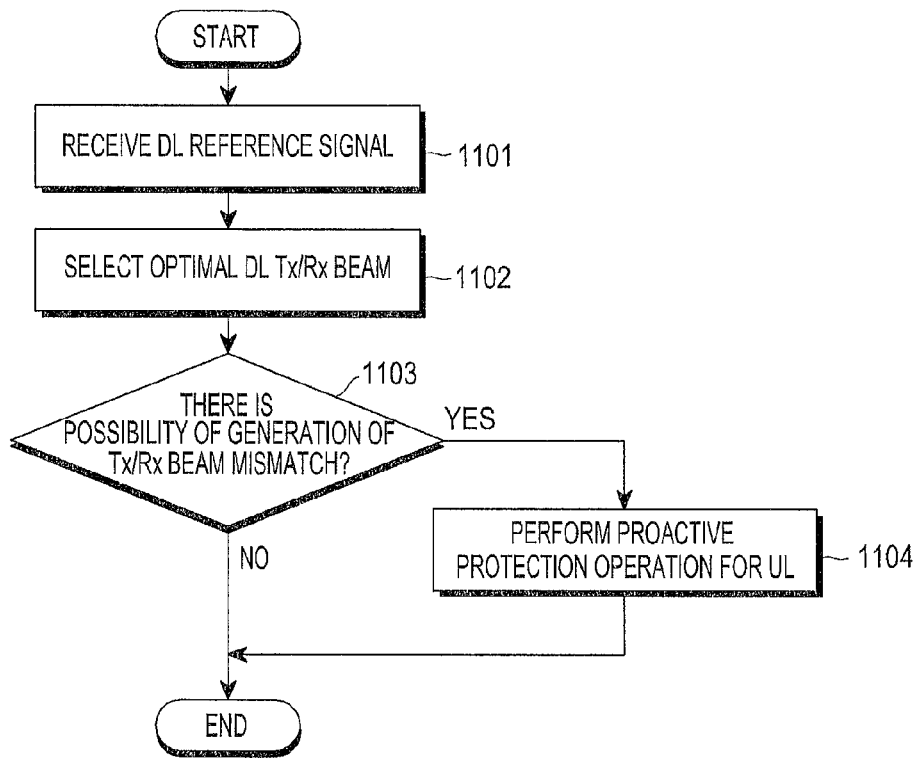
FIG. 11 is a flowchart illustrating an example in which a UE determines a possibility of the generation of the Tx/Rx beam mismatch in the beamforming system and performs a proactive protection operation according to an embodiment of the present disclosure.

FIG. 11 is a flowchart illustrating an example in which the UE determines a possibility of the occurrence of the Tx/Rx beam mismatch and performs the proactive protection operation in the beamforming system according to an embodiment of the present disclosure.

Referring to FIG. 11, it is assumed that the UE determines the possibility of the occurrence of the Tx/Rx beam mismatch in particular sub-frame n.

The UE receives a DL reference signal from the BS in step 1101 and proceeds to step 1102. The UE selects an optimal DL Tx/Rx beam by performing a DL Tx/Rx beam selecting operation periodically or aperiodically based on the received DL reference signal in step 1102 and proceed to step 1103.

In step 1103, the UE determines whether there is the possibility of the occurrence of the Tx/Rx beam mismatch between the selected optimal DL Tx/Rx beam and a DL Tx/Rx beam actually used for transmitting information on the optimal DL Tx/Rx beam. For example, as a result of the Tx/Rx beam selecting operation, if an optimal DL Tx/Rx beam having a capability equal to or larger than a particular threshold, for example, threshold 4 is different from a previously selected optimal DL Tx/Rx beam and the previously selected optimal DL Tx/Rx beam has a capability equal to or smaller than a particular threshold, for example, threshold 5, the UE determines that a rapid change has occurred in a DL channel environment and determines that there is the possibility of the occurrence of the DL Tx/Rx beam mismatch. The capability of the optimal DL Tx/Rx beam can be measured by an RSSI, an SINR or the like. Further, although it has been described as an example that the UE determines that there is the possibility of the occurrence of the DL Tx/Rx beam mismatch, the UE can also determine that there is a possibility of the occurrence of the UL Tx/Rx beam mismatch by the reciprocity.

Further, when a frequency with which the optimal DL Tx/Rx beam is changed per second is equal to or larger than a particular value, for example, K or a movement speed of the UE is equal to or larger than a particular value, for example, v (km/h), the UE determines that there is a possibility of the occurrence of the DL Tx/Rx beam mismatch. The movement speed of the UE can be measured based on a positioning system such as a Global Positioning System (GPS) or based on a channel state change between the BS and the UE or a number of handovers per hour.

If the UE determines that there is the possibility of the occurrence of the Tx/Rx beam mismatch in step 1103, the UE performs the proactive protection operation for the UL in step 1104. That is, the UE increases a diversity effect by widening a width of the UL Tx/Rx beam or increasing a number of Tx/Rx beams to prevent the Tx/Rx beam mismatch in advance. Alternatively, the UE reduces a period of the Tx/Rx beam selecting operation for selecting the optimal DL Tx/Rx beam or reduces a transmission period of the UL reference signal to prevent the Tx/Rx beam mismatch in advance.

Meanwhile, when the UE determines that there is no possibility of the occurrence of the Tx/Rx beam mismatch in step 1103, the UE ends the operation being currently performed.

Figure 12:
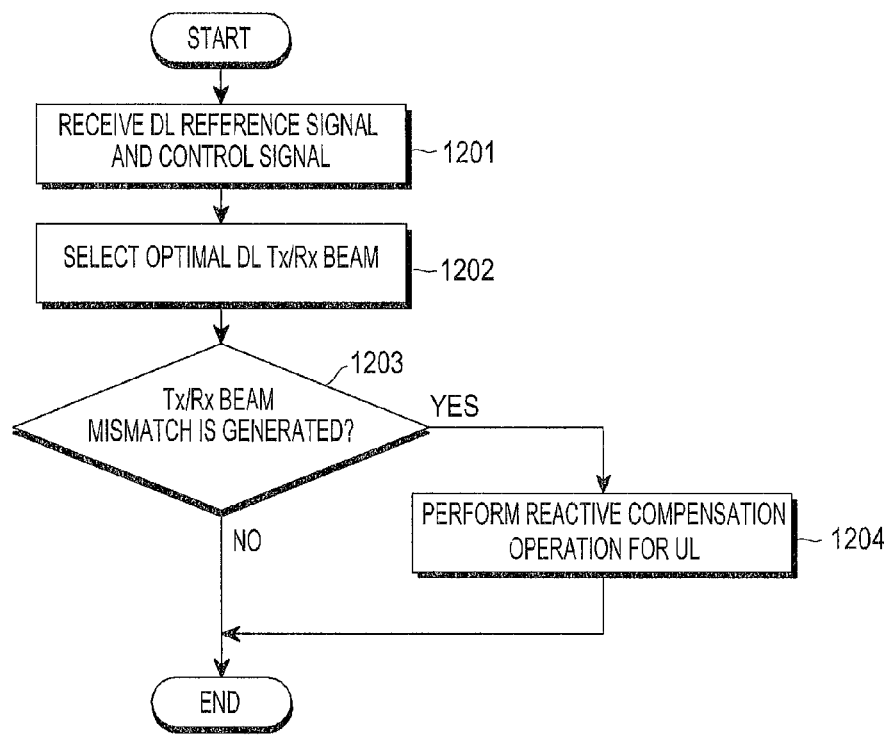
FIG. 12 is a flowchart illustrating an example in which a UE determines a possibility of the generation of the Tx/Rx beam mismatch in the beamforming system and performs a reactive compensation operation according to an embodiment of the present disclosure.

FIG. 12 is a flowchart illustrating an example in which the UE determines a possibility of the occurrence of the Tx/Rx beam mismatch and performs the reactive compensation operation in the beamforming system according to an embodiment of the present disclosure.

Referring to FIG. 12, it is assumed that the UE determines the possibility of the occurrence of the Tx/Rx beam mismatch in a particular sub-frame n.

The UE receives a DL reference signal and a control signal from the BS in step 1201 and proceeds to step 1202. The UE selects an optimal DL Tx/Rx beam by performing a DL Tx/Rx beam selecting operation periodically or aperiodically based on the received DL reference signal or control signal in step 1202 and proceed to step 1203.

In step 1203, the UE determines whether the Tx/Rx beam mismatch occurs between the selected optimal DL Tx/Rx beam and a DL Tx/Rx beam actually used for transmitting information on the optimal DL Tx/Rx beam. For example, when the selected optimal DL Tx/Rx beam has a capability equal to or larger than particular threshold, for example, threshold 6 and the UE has not received optimal Tx/Rx beam information selected for the UL channel by the BS for a particular time, the UE determines that the DL Tx/Rx beam mismatch occurs. Further, if the selected optimal DL Tx/Rx beam has a capability equal to or larger than threshold 6 and the UE has not continuously received an ACK message of a control signal or data transmitted to the BS by a predetermined number of times or more, the UE determines that the DL Tx/Rx beam mismatch occurs. The capability of the optimal DL Tx/Rx beam can be measured by an RSSI, an SINR or the like. Further, although it has been described as an example that the UE determines that the DL Tx/Rx beam mismatch occurs, the UE can also determine that the UL Tx/Rx beam mismatch occurs by the reciprocity.

When the UE determines that the Tx/Rx beam mismatch occurs in step 1203, the UE performs the reactive compensation operation for the UL in step 1204. The reactive compensation operation will be described in more detail with reference to FIGS. 13 and 14 described later.

Meanwhile, if the UE determines that the Tx/Rx beam mismatch does not occurred in step 1203, the UE ends the operation being currently performed.

Figure 13:
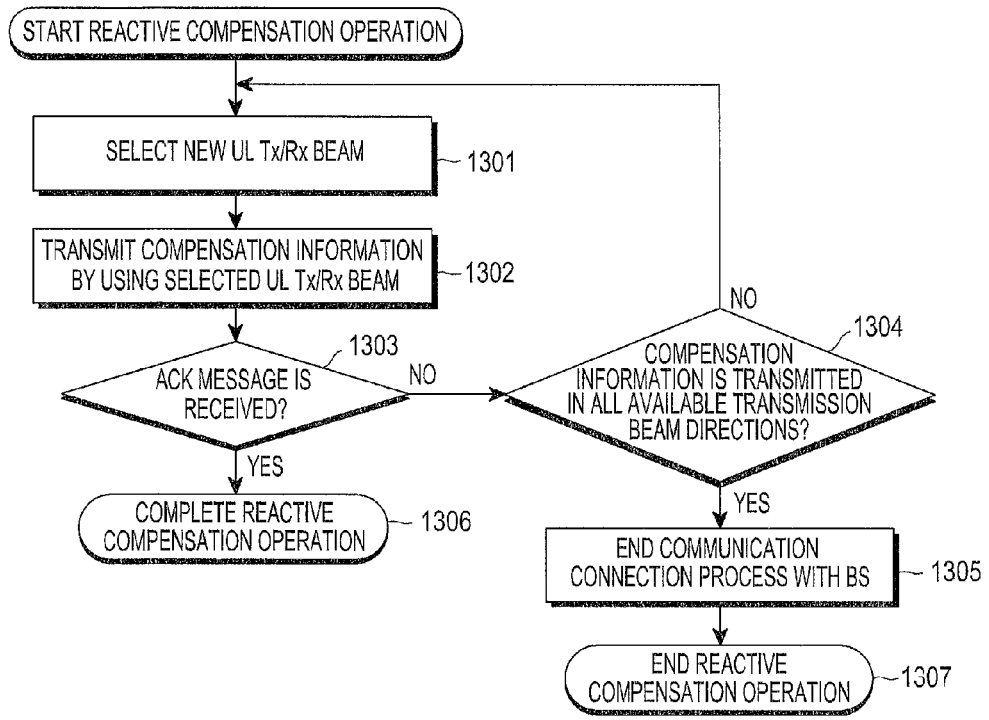
FIG. 13 is a flowchart illustrating an example in which a UE performs a reactive compensation operation in the beamforming system according to an embodiment of the present disclosure.

FIG. 13 is a flowchart illustrating an example in which the UE performs the reactive compensation operation in the beamforming system according to an embodiment of the present disclosure.

Referring to FIG. 13, the description of the reactive compensation operation described below corresponds to a more detailed description of step 1204 of FIG. 12 and the reactive compensation operation can refer to a reactive compensation operation in a case where the UE determines that the Tx/Rx beam mismatch occurs in particular sub-frame n.

Based on an assumption of the reciprocity between the UL and the DL, the UE selects a new UL Tx/Rx beam based on DL Tx/Rx beam information pre-received from the BS in step 1301 and proceeds to step 1302. For example, the UE can select a UL Tx/Rx beam corresponding to a Tx/Rx beam having a most excellent reception capability among DL Tx/Rx beams received from the BS.

The UE transmits compensation information through a scheduling channel or a control channel by using the selected UL Tx/Rx beam in step 1302 and proceeds to step 1303. The compensation information includes an identifier of the UE and an optimal DL Tx/Rx beam index.

In step 1303, the UE determines whether an ACK message of the compensation information transmitted in step 1302 is received from the BS. When the ACK message is received, the UE proceeds to step 1306 to select the reactive compensation operation being performed.

Meanwhile, when the ACK message of the compensation information transmitted in step 1303 is not received from the BS in step 1302, the UE proceeds to step 1304. The UE determines whether the compensation information is transmitted in all available transmission beam directions in step 1304. If the compensation information is transmitted in all available transmission beam directions, the UE ends a communication connection process with the BS in step 1305. Thereafter, the UE ends the reactive compensation operation in step 1307.

However, when the compensation information cannot be transmitted in all available transmission beam directions in step 1304, the UE proceeds to step 1301 to select a new UL Tx/Rx beam which has not been previously selected and re-performs steps 1302 and 1303.

Figure 14:
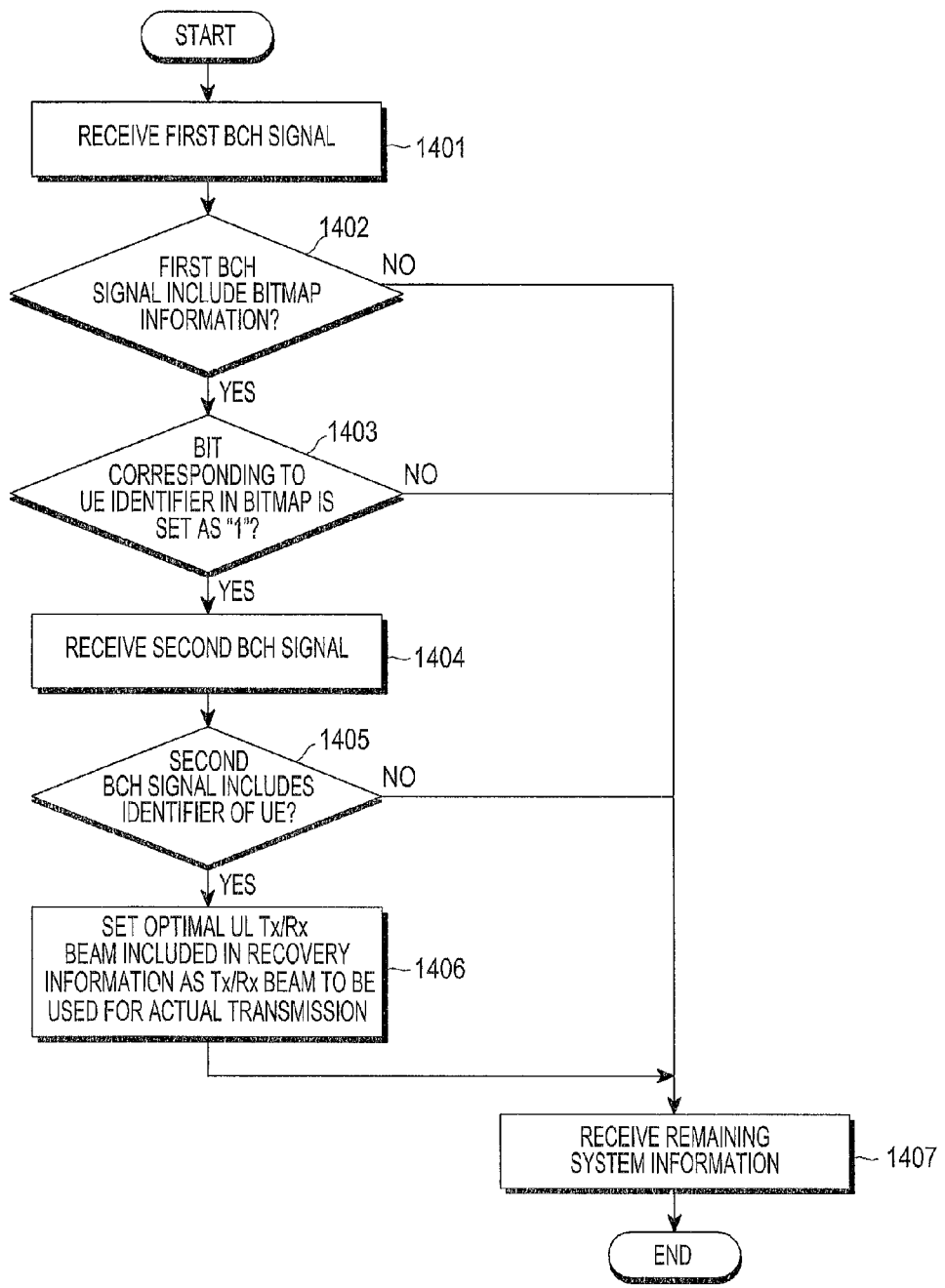
FIG. 14 is a flowchart illustrating a process in which a UE receives system information in the beamforming system according to an embodiment of the present disclosure.

FIG. 14 is a flowchart illustrating a process in which the UE receives system information in the beamforming system according to an embodiment of the present disclosure.

Referring to FIG. 14, the description will be made based on an assumption that the BS configures compensation information in primary and secondary BCH regions of the DL sub-frame and transmits the compensation information. Further, a process in the UE receives the compensation information configured and transmitted by the BS as system information will be described thereafter.

The UE receives a primary BCH signal of the DL sub-frame transmitted from the BS in step 1401 and proceeds to step 1402. The UE determines whether the received primary BCH signal includes bitmap information in which information related to the UE is configured in step 1402. When the primary BCH signal includes the bitmap information, the UE proceeds to step 1403.

In step 1403, the UE determines whether a bit corresponding to an identifier of the UE is set as "1" among bits included in the bitmap including the primary BCH signal. When the bit corresponding to the identifier of the UE among the bits included in the bitmap is set as "1", the UE receives a secondary BCH signal of the DL sub-frame transmitted from the BS in step 1404. Thereafter, the UE determines whether compensation information included in the received secondary BCH signal includes the identifier of the UE in step 1405. If the compensation information includes the identifier of the UE, the UE proceeds to step 1406. In step 1406, the UE configures an UL Tx/Rx beam indicated by information on an optimal UL Tx/Rx beam included in the secondary BCH signal as a UL Tx/Rx beam to be used for actual transmission and transmits a response message of the compensation information to the BS. The response message can be, for example, an ACK message of the compensation information or a message including information on the optimal DL Tx/Rx beam. Thereafter, the UE receives System Information (SI) included in the DL sub-frame in step 1407.

Meanwhile, when the received primary BCH signal does not include the bitmap information in step 1402, when the bit corresponding to the identifier of the UE among the bits included in the bitmap is not set as "1" in step 1403, and when the compensation information included in the received secondary BCH signal does not include the identifier of the UE in step 1405, the UE proceeds to step 1407 to receive the SI included in the DL sub-frame transmitted from the BS.

Figure 15:
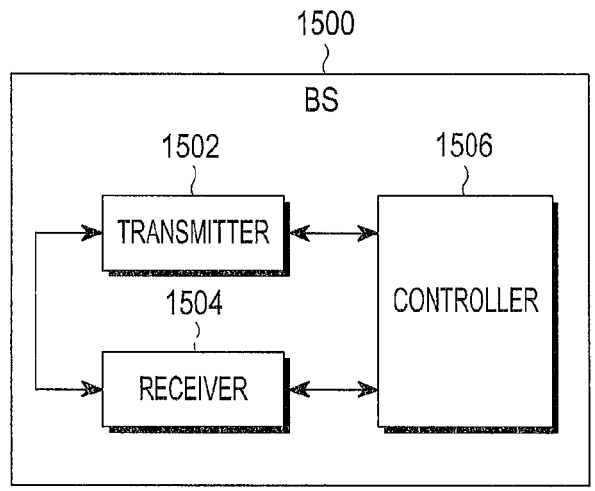
FIG. 15 is a block diagram illustrating a structure of a BS apparatus that provides an optimal Tx/Rx beam to a UE by solving a Tx/Rx beam mismatch problem in the beamforming system according to an embodiment of the present disclosure.

FIG. 15 is a block diagram illustrating a structure of a BS apparatus that provides an optimal Tx/Rx beam to a UE by solving the Tx/Rx beam mismatch problem in the beamforming system according to an embodiment of the present disclosure.

Referring to FIG. 15, a BS 1500 includes a transmitter 1502, a receiver 1504, and a controller 1506.

First, an operation in which the BS 1500 provides the optimal Tx/Rx beam through a proactive protection scheme will be described below.

The receiver of the BS 1500 receives a UL reference signal from the UE and the controller 1506 selects an optimal UL Tx/Rx beam by performing a UL Tx/Rx beam selecting operation for the UE periodically or aperiodically based on the UL reference signal received through the receiver 1504.

The controller 1506 of the BS 1500 determines whether there is a possibility of the occurrence of the Tx/Rx beam mismatch between the selected optimal UL Tx/Rx beam and a UL Tx/Rx beam actually used for transmitting information on the optimal UL Tx/Rx beam. That is, as a result of the Tx/Rx beam selecting operation, when an optimal UL Tx/Rx beam having a capability equal to or higher than threshold 1 is different from a previously selected optimal UL Tx/Rx beam and the previously selected optimal UL Tx/Rx beam has a capability equal to or smaller than threshold 2, the controller 1506 determines that a rapid change has occurred in a UL channel environment and determines that there is the possibility of the occurrence of the UL Tx/Rx beam mismatch. The capability of the optimal UL Tx/Rx beam can be measured by an RSSI, an SINR or the like. Further, although it has been described as an example that the controller 1506 of the BS 1500 determines that there is the possibility of the occurrence of the UL Tx/Rx beam mismatch, the controller 1506 can also determine that there is a possibility of the occurrence of the DL Tx/Rx beam mismatch by the reciprocity.

Further, when a frequency with which the optimal UL Tx/Rx beam is changed per second is equal to or larger than a preset value K or a movement speed of the UE is equal to or larger than a preset speed v (km/h), the controller 1506 of the BS 1500 determines that there is the possibility of the occurrence of the DL Tx/Rx beam mismatch. Thereafter, when the controller 1506 determines that there is the possibility of the occurrence of the Tx/Rx beam mismatch, the controller 1506 performs the proactive protection operation for the DL. That is, the controller 1506 of the BS 1500 increases a diversity effect by widening a width of the DL Tx/Rx beam or increasing a number of Tx/Rx beams to prevent the Tx/Rx beam mismatch in advance. Alternatively, the controller 1506 of the BS 1500 reduces a period of the Tx/Rx beam selecting operation for selecting the optimal UL Tx/Rx beam or reduces a transmission period of the DL reference signal to prevent the Tx/Rx beam mismatch in advance.

Next, an operation in which the BS 1500 provides the optimal Tx/Rx beam through a reactive compensation scheme will be described below.

The receiver 1504 of the BS 1500 receives a UL reference signal and a control signal from the UE and the controller 1506 selects an optimal UL Tx/Rx beam by performing a UL Tx/Rx beam selecting operation for the UE periodically or aperiodically based on the UL reference signal and control signal received through the receiver 1504.

The controller 1506 of the BS 1500 determines whether there the Tx/Rx beam mismatch occurs between the selected optimal UL Tx/Rx beam and a UL Tx/Rx beam actually used for transmitting information on the optimal UL Tx/Rx beam. That is, when the selected optimal UL Tx/Rx beam has a capability equal to or larger than threshold 3 and Channel Status Information (CSI) measured and reported for the DL channel by the UE or optimal Tx/Rx beam information selected for the UL channel by the UE has not been received for a particular time, the controller 1506 determines that the UL Tx/Rx beam mismatch occurs. Further, when the selected optimal UL Tx/Rx beam has a capability equal to or larger than threshold 3 and the an ACK message of a control signal or data transmitted to the UE has not been continuously received by a predetermined number of times or more, the controller 1506 determines that the UL Tx/Rx beam mismatch occurs. The capability of the optimal UL Tx/Rx beam can be measured by an RSSI, an SINR or the like. Further, although it has been described as an example that the controller 1506 of the BS 1500 determines that the UL Tx/Rx beam mismatch occurs, the controller 1506 can also determine that the DL Tx/Rx beam mismatch occurs by the reciprocity.

When the controller 1506 of the BS 1500 determines that the Tx/Rx beam mismatch occurs, the controller 1506 performs a reactive compensation operation for the DL. That is, based on an assumption of the reciprocity between the UL and the DL, the controller 1506 selects a new DL Tx/Rx beam based on UL Tx/Rx beam information pre-received from the UE through the receiver 1504. The new DL Tx/Rx beam can be a DL Tx/Rx beam corresponding to a Tx/Rx beam having a most excellent capability among UL Tx/Rx beams received from the UE.

The transmitter 1502 of the BS 1500 transmits compensation information through a scheduling channel or a control channel by using the selected DL Tx/Rx beam. The compensation information includes an identifier of the UE and an optimal UL Tx/Rx beam index.

The receiver 1504 of the BS 1500 determines whether an ACK message of the compensation information transmitted through the transmitter 1502 is received from the UE. When the ACK message is received, the BS 1500 completes the reactive compensation operation being performed. However, when the ACK message of the compensation information transmitted through transmitter 1502 is not received, the receiver 1504 of the BS 1500 determines whether the transmitter 1502 transmits the compensation information in all available transmission beam directions. When the compensation information is transmitted in all available transmission beam directions, a communication connection process with the UE and the reactive compensation operation end. However, when the transmitter 1502 has not transmitted the compensation information in all available transmission beam directions, the BS 1500 selects a new DL Tx/Rx beam which has been previously selected, through the controller 1506, and the transmitter 1502 re-transmits the compensation information by using the selected new DL Tx/Rx beam.

Meanwhile, when re-transmitting the compensation information, the transmitter 1502 of the BS 1500 configures an identifier of the UE, information derived from the identifier of the UE, or information related to the identifier of the UE in a primary BCH region of the DL sub-frame. That is, the transmitter 1502 configures a bit corresponding to the identifier of the UE among bits included in a bitmap as "1". Further, the transmitter 1502 configures more detailed information indicating the identifier of the UE and an index of the optimal Tx/Rx beam in a secondary BCH region of the DL sub-frame. Thereafter, the transmitter transmits the DL sub-frame including the configured primary and secondary BCH regions to the UE. Next, the controller 1506 of the BS 1500 determines whether a response message of the compensation information configured and transmitted in the secondary BCH region is received, from the UE. The response message can be, for example, an ACK message of the transmitted compensation information or a message including information on the optimal DL Tx/Rx beam.

Figure 16:
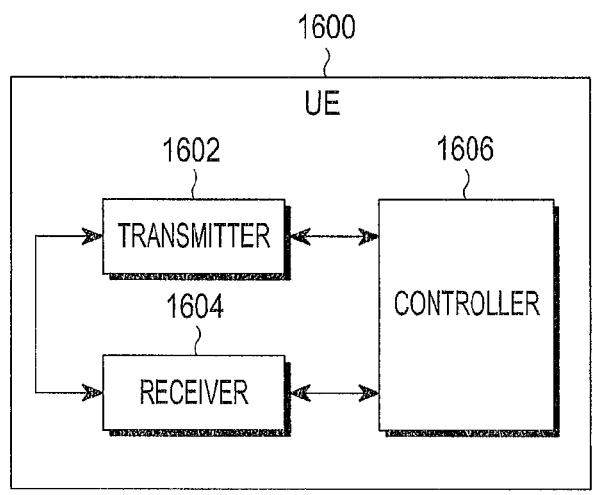
FIG. 16 is a block diagram illustrating a structure of a UE apparatus that provides an optimal Tx/Rx beam to a BS by solving the Tx/Rx beam mismatch problem in the beamforming system according to an embodiment of the present disclosure.

FIG. 16 is a block diagram illustrating a structure of a UE apparatus that provides an optimal Tx/Rx beam to a BS by solving the Tx/Rx beam mismatch problem in the beamforming system according to an embodiment of the present disclosure.

Referring to FIG. 16, a UE 1600 includes a transmitter 1602, a receiver 1604, and a controller 1606.

First, an operation in which the UE 1600 provides the optimal Tx/Rx beam through a proactive protection scheme will be described below.

The receiver 1604 of the UE 1600 receives a DL reference signal from the BS and the controller 1606 selects an optimal DL Tx/Rx beam by performing a DL Tx/Rx beam selecting operation periodically or aperiodically based on the DL reference signal received through the receiver 1604.

The controller 1606 of the UE 1600 determines whether there is a possibility of the occurrence of the Tx/Rx beam mismatch between the selected optimal DL Tx/Rx beam and a DL Tx/Rx beam actually used for transmitting information on the optimal DL Tx/Rx beam. That is, as a result of the Tx/Rx beam selecting operation, when an optimal DL Tx/Rx beam having a capability equal to or larger than threshold 4 is different from a previously selected optimal DL Tx/Rx beam and the previously selected optimal DL Tx/Rx beam has a capability equal to or smaller than threshold 5, the controller 1606 determines that a rapid change has occurred in a DL channel environment and determines that there is the possibility of the occurrence of the DL Tx/Rx beam mismatch. The capability of the optimal DL Tx/Rx beam can be measured by an RSSI, an SINR or the like. Further, although it has been described as an example that the controller 1606 of the UE 1600 determines that there is the possibility of the occurrence of the DL Tx/Rx beam mismatch, the controller 1606 can also determine that there is a possibility of the occurrence of the UL Tx/Rx beam mismatch by the reciprocity.

Further, when a frequency with which the optimal DL Tx/Rx beam is changed per second is equal to or larger than a preset value K or a movement speed of the UE is equal to or larger than a preset speed v (km/h), the controller 1606 of the UE 1600 determines that there is the possibility of the occurrence of the DL Tx/Rx beam mismatch. Thereafter, when the controller 1606 determines that there is the possibility of the occurrence of the Tx/Rx beam mismatch, the controller 1606 performs the proactive protection operation for the UL. That is, the controller 1606 of the UE 1600 increases a diversity effect by widening a width of the UL Tx/Rx beam or increasing a number of Tx/Rx beams to prevent the Tx/Rx beam mismatch in advance. Alternatively, the controller 1606 of the UE 1600 reduces a period of the Tx/Rx beam selecting operation for selecting the optimal DL Tx/Rx beam or reduces a transmission period of the UL reference signal to prevent the Tx/Rx beam mismatch in advance.

Next, an operation in which the UE 1600 provides the optimal Tx/Rx beam through a reactive compensation scheme will be described below.

The receiver 1604 of the UE 1600 receives a DL reference signal and a control signal from the BS and the controller 1606 selects an optimal DL Tx/Rx beam by performing a DL Tx/Rx beam selecting operation periodically or aperiodically based on the DL reference signal or control signal received through the receiver 1604.

The controller 1606 of the UE 1600 determines whether the Tx/Rx beam mismatch occurs between the selected optimal DL Tx/Rx beam and a DL Tx/Rx beam actually used for transmitting information on the optimal DL Tx/Rx beam. That is, when the selected optimal DL Tx/Rx beam has a capability equal to or larger than threshold 6 and optimal Tx/Rx beam information selected for the UL channel by the BS has not been received for a particular time, the controller 1606 determines that the DL Tx/Rx beam mismatch occurs. Further, when the selected optimal DL Tx/Rx beam has a capability equal to or larger than threshold 6 and an ACK message of a control signal or data transmitted to the BS has not been continuously received by a predetermined number of times or more, the controller 1606 determines that the DL Tx/Rx beam mismatch occurs. The capability of the optimal DL Tx/Rx beam can be measured by an RSSI, an SINR or the like. Further, although it has been described as an example that the controller 1606 of the UE 1600 determines that the DL Tx/Rx beam mismatch occurs, the controller 1606 can also determine that the UL Tx/Rx beam mismatch occurs by the reciprocity.

When the controller 1606 of the UE 1600 determines that the Tx/Rx beam mismatch occurs, the controller 1606 performs a reactive compensation operation for the UL. That is, based on an assumption of the reciprocity between the UL and the DL, the controller 1606 selects a new UL Tx/Rx beam based on DL Tx/Rx beam information pre-received from the BS through the receiver 1604. The new UL Tx/Rx beam can be a UL Tx/Rx beam corresponding to a Tx/Rx beam having a most excellent reception capability among DL Tx/Rx beams received from the BS.

The transmitter 1602 of the UE 1600 transmits compensation information through a scheduling channel or a control channel by using the selected UL Tx/Rx beam in step. The compensation information includes an identifier of the UE and an optimal DL Tx/Rx beam index.

The receiver 1604 of the UE 1600 determines whether an ACK message of the compensation information transmitted through transmitter 1602 is received from the BS. When the ACK message is received, the UE 1600 completes the reactive compensation operation being performed. However, when the ACK message of the compensation information transmitted through transmitter 1602 is not received, the receiver 1604 of the UE 1600 determines whether the transmitter 1602 transmits the compensation information in all available transmission beam directions. When the compensation information is transmitted in all available transmission beam directions, a communication connection process with the BS and the reactive compensation operation end. However, when the transmitter 1602 has not transmitted the compensation information in all available transmission beam directions, the UE 1600 selects a new UL Tx/Rx beam which has been previously selected, through the controller 1606, and the transmitter 1602 re-transmits the compensation information by using the selected new UL Tx/Rx beam.

Meanwhile, the receiver 1604 of the UE 1600 receives the compensation information configured in primary and secondary BCH regions of the DL sub-frame and transmitted, as system information, and determines whether bitmap information in which information related to the UE is configured is included in the primary BCH region. When the bitmap information is included in the primary BCH region, the controller 1606 determines a bit corresponding to an identifier of the UE among bits included in the bitmap. When the bit corresponding to the identifier of the UE is "1", the controller 1606 determines whether compensation information included in the secondary BCH region includes the identifier of the UE. When the compensation information includes the identifier of the UE, the controller 1606 configures a UL Tx/Rx beam indicated by optimal Tx/Rx beam information configured in the secondary BCH region as a UL Tx/Rx beam to be used for actual transmission/reception. Thereafter, the transmitter 1602 of the UE 1600 transmits a response message of the compensation information to the BS. The response message can be, for example, an ACK message of the compensation information or a message including information on the optimal DL Tx/Rx beam.

Although concrete embodiments have been described in the detailed description of the present disclosure, the embodiments can be modified in various forms without departing from the scope of the present disclosure. Therefore, the scope of the present disclosure is not limited to the embodiments described above, and should be defined by the appended claims and the equivalents thereof.

Further, a method and an apparatus for providing an optimal Tx/Rx beam according to an embodiment of the present disclosure can be implemented in the form of hardware, software, or a combination thereof. Any such software can be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure.

Accordingly, the present disclosure includes a program including a code for implementing the apparatus and method described in the appended claims of the specification and a machine (a computer or the like)-readable storage medium for storing the program. Moreover, such a program can be electronically transferred through an arbitrary medium such as a communication signal transferred through a wired or wireless connection, and the present disclosure properly includes the equivalents thereof.

In addition, the apparatus for providing the optimal Tx/Rx beam according to the embodiment of the present disclosure can receive a program from a program providing apparatus connected to the apparatus wirelessly or through a wire and store the received program. The program providing apparatus can include a program for instructing to perform a preset content protecting method, a memory for storing information required for the content protecting method, a communication unit for performing wired or wireless communication with the apparatus for providing the optimal Tx/Rx beam, and a controller for transmitting the corresponding program to a transmission/reception device according to a request of the apparatus for providing the optimal Tx/Rx beam or automatically.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of providing an optimal transmission or reception (Tx/Rx) beam in a beamforming system, the method comprising:
    receiving a reference signal;
    selecting a Tx/Rx beam based on the received reference signal;
    performing at least one Tx/Rx beam pre-adjustment operation prior to using the selected Tx/Rx beam, based on a capability of the selected Tx/Rx beam and a capability of a previously selected Tx/Rx beam; and
    transmitting information on the selected Tx/Rx beam according to the at least one Tx/Rx beam pre-adjustment operation,
    wherein the at least one Tx/Rx beam pre-adjustment operation comprises an operation of reducing a transmission period of the reference signal.

2. The method of claim 1, wherein performing comprises:
    determining whether the selected Tx/Rx beam having a capability equal to or larger than a first threshold is identical to the previously selected Tx/Rx beam;
    when the selected Tx/Rx beam is not identical to the previously selected Tx/Rx beam, determining whether the capability of the previously selected Tx/Rx beam has a capability equal to or smaller than a second threshold; and
    when the capability of the previously selected Tx/Rx beam is equal to or smaller than the second threshold, performing the at least one Tx/Rx beam pre-adjustment operation.

3. The method of claim 1, wherein the performing further comprises:
    determining whether a frequency with which the selected Tx/Rx beam is changed per second is equal to or larger than a preset value; and
    when the frequency with which the selected Tx/Rx beam is changed per second is equal to or larger than the preset value, performing the at least one Tx/Rx beam pre-adjustment operation.

4. The method of claim 1, wherein the performing further comprises:
    determining whether a movement speed of a user equipment (UE) is equal to or faster than a preset speed; and
    when the movement speed of the UE is equal to or faster than the preset speed, performing the at least one Tx/Rx beam pre-adjustment operation.

5. The method of claim 1, further comprising:
    when a mismatch occurs between the selected Tx/Rx beam and the previously selected Tx/Rx beam, selecting a new Tx/Rx beam based on pre-received Tx/Rx beam information; and
    transmitting, by a base station, compensation information including at least one of information related to a user equipment (UE) and information related to the selected Tx/Rx beam through the new Tx/Rx beam.

6. The method of claim 5, further comprising:
    when the capability of the selected Tx/Rx beam is equal to or larger than a first threshold, determining whether response messages of pre-transmitted control signals or data have been received more than a predetermined number of times or more; and
    when the response messages have not been received more than the predetermined number of times or more, determining that the mismatch occurs.

7. The method of claim 5, further comprising:
    when the capability of the selected Tx/Rx beam is equal to or larger than a first threshold, determining whether channel status information measured and reported by the UE or information related to a new Tx/Rx beam selected by the UE has been received within a predetermined time; and
    when the channel status information or the information on the new Tx/Rx beam selected by the UE has not been received within the predetermined time, determining that the mismatch occurs.

8. The method of claim 5, further comprising:
    when the capability of the selected Tx/Rx beam is equal to or larger than a first threshold, determining whether information on a new Tx/Rx beam selected by a base station (BS) has been received within a predetermined time; and when the information related to the new Tx/Rx beam selected by the BS has not been received within the predetermined time, determining that the mismatch occurs.

9. The method of claim 5, wherein the transmitting the compensation information comprises:
configuring at least one of information related to the UE and information related to the selected Tx/Rx beam in a broadcasting channel (BCH) region and transmitting the configured information in all available beam directions.

10. The method of claim 5, wherein the selecting the new Tx/Rx beam comprises selecting a new DL Tx/Rx beam based on a pre-received uplink (UL) Tx/Rx beam or selecting a new UL Tx/Rx beam based on a pre-received downlink (DL) Tx/Rx beam based on a reciprocality between UL and DL.

11. The method of claim 5, wherein the transmitting the compensation information comprises:
configuring an identifier of the UE or information derived from the identifier of the UE in a primary broadcasting channel (BCH) region of a downlink (DL) sub-frame;
configuring information related to the identifier of the UE and information related to the selected Tx/Rx beam in a secondary BCH region of the DL sub-frame; and
transmitting the DL sub-frame including the primary and secondary BCH regions.

12. The method of claim 5, further comprising:
receiving a downlink (DL) sub-frame including primary and secondary broadcasting channel (BCH) regions;
when bitmap information is included in the primary BCH region, determining a bit related to an identifier of the UE among bits included in a bitmap; and
when the bit related to the identifier of the UE is "1", setting a Tx/Rx beam indicated by information on the selected Tx/Rx beam included in the secondary BCH region as a Tx/Rx beam to be used for actual transmission or reception.

13. The method of claim 1, wherein the at least one Tx/Rx beam pre-adjustment operation further comprises an operation of widening a beam width of the selected Tx/Rx beam, an operation of increasing a number of Tx/Rx beams or an operation of reducing a period of a beam selection operation for selecting the selected Tx/Rx beam.

14. An apparatus for providing an optimal transmission or reception (Tx/Rx) beam in a beamforming system, the apparatus comprising:
a transceiver configured to receive a reference signal; and
a controller configured to:
select an Tx/Rx beam based on the received reference signal,
perform at least one Tx/Rx beam pre-adjustment operation prior to using the selected Tx/Rx beam, based on a capability of the selected Tx/Rx beam and a capability of a previously selected Tx/Rx beam; and
control the transceiver to transmit information on the selected Tx/Rx beam according to the at least one Tx/Rx beam pre-adjustment operation,
wherein the at least one Tx/Rx beam pre-adjustment operation comprises an operation of reducing a transmission period of the reference signal.

15. The apparatus of claim 14, wherein the controller is configured to:
determine whether the selected Tx/Rx beam having a capability equal to or larger than a first threshold is identical to the previously selected Tx/Rx beam;
when the selected Tx/Rx beam is not identical to the previously selected Tx/Rx beam, determine whether the capability of the previously selected Tx/Rx beam has a capability equal to or smaller than a second threshold; and
when the capability of the previously selected Tx/Rx beam is equal to or smaller than the second threshold, perform the at least one Tx/Rx beam pre-adjustment operation.

16. The apparatus of claim 14, wherein the controller is further configured to:
determine whether a frequency with which the selected Tx/Rx beam is changed per second is equal to or larger than a preset value; and
when the frequency with which the selected Tx/Rx beam is changed per second is equal to or larger than the preset value, perform the at least one Tx/Rx beam pre-adjustment operation.

17. The apparatus of claim 14, wherein the controller is further configured to:
determine whether a movement speed of a user equipment (UE) is equal to or faster than a preset speed; and
when the movement speed of the UE is equal to or faster than the preset speed, perform the at least one Tx/Rx beam pre-adjustment operation.

18. The apparatus of claim 14, wherein the controller is configured to:
when a mismatch occurs between the selected Tx/Rx beam and the previously selected Tx/Rx beam, select a new Tx/Rx beam based on pre-received Tx/Rx beam information,
wherein the transceiver is configured to transmit compensation information including at least one of information related to a user equipment (UE) and information related to the selected Tx/Rx beam through the new Tx/Rx beam.

19. The apparatus of claim 18, wherein the controller is further configured to:
when the capability of the selected Tx/Rx beam is equal to or larger than a first threshold, determine whether response messages of pre-transmitted control signals or data have been received more than a predetermined number of times or more; and
when the response messages have not been received more than the predetermined number of times or more, determine that the mismatch occurs.

20. The apparatus of claim 18, wherein the controller is further configured to:
when the capability of the selected Tx/Rx beam is equal to or larger than a first threshold, determine whether channel status information measured and reported by the UE or information related to a selected Tx/Rx beam selected by the UE has been received within a predetermined time; and
when the channel status information or the information on the new Tx/Rx beam selected by the UE has not received within the predetermined time, determine that the mismatch occurs.

21. The apparatus of claim 18, wherein the controller is further configured to:
when the capability of the selected Tx/Rx beam is equal to or larger than a first threshold, determine whether information on a new Tx/Rx beam selected by a base station (BS) has been received within a predetermined time; and when the information related to the new Tx/Rx beam selected by the BS has not been received within the predetermined time, determine that the mismatch occurs.

22. The apparatus of claim 18, wherein the transceiver is configured to:

configure at least one of information related to the UE and information related to the selected Tx/Rx beam in a broadcasting channel (BCH) region and transmits the configured information in all available beam directions, and wherein the apparatus is a base station.

23. The apparatus of claim 18, wherein the controller is configured to:

select a new DL Tx/Rx beam based on a pre-received uplink (UL) Tx/Rx beam, or a new UL Tx/Rx beam based on a pre-received downlink (DL) Tx/Rx beam based on a reciprocality between UL and DL.

24. The apparatus of claim 18, wherein the transceiver is configured to:

configure an identifier of the UE or information derived from the identifier of the UE in a primary broadcasting channel (BCH) region of a downlink (DL) sub-frame;

configure information related to the identifier of the UE and information related to the selected Tx/Rx beam in a secondary BCH region of the DL sub-frame; and transmit the DL sub-frame including the primary and secondary BCH regions, and wherein the apparatus is a base station.

25. The apparatus of claim 18, wherein:

the transceiver is configured to receive a downlink (DL) sub-frame including primary and secondary broadcasting channel (BCH) regions; and the controller is configured to:

when bitmap information is included in the primary BCH region, determine a bit related to an identifier of the UE among bits included in a bitmap; and when the bit related to the identifier of the UE is "1", set a Tx/Rx beam indicated by information on the optimal Tx/Rx beam included in the secondary BCH region as a Tx/Rx beam to be used for actual transmission or reception.

26. The apparatus of claim 14, wherein the at least one Tx/Rx beam pre-adjustment operation further comprises an operation of widening a beam width of the selected Tx/Rx beam, an operation of increasing a number of Tx/Rx beams, beams or an operation of reducing a period of a beam selection operation for selecting the selected Tx/Rx beam.

* * * * *